(12) United States Patent
Takamatsu et al.

(10) Patent No.: US 11,565,701 B2
(45) Date of Patent: Jan. 31, 2023

(54) DRIVING ASSIST METHOD AND DRIVING ASSIST DEVICE

(71) Applicants: Nissan Motor Co., Ltd., Yokohama (JP); Renault S.A.S., Boulogne-Billancourt (FR)

(72) Inventors: Yoshiro Takamatsu, Kanagawa (JP); Susumu Fujita, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/258,782

(22) PCT Filed: Jul. 11, 2018

(86) PCT No.: PCT/IB2018/000877
§ 371 (c)(1),
(2) Date: Jan. 8, 2021

(87) PCT Pub. No.: WO2020/012210
PCT Pub. Date: Jan. 16, 2020

(65) Prior Publication Data
US 2021/0122375 A1 Apr. 29, 2021

(51) Int. Cl.
*B60W 30/18* (2012.01)
*B60W 60/00* (2020.01)
(Continued)

(52) U.S. Cl.
CPC ..... *B60W 30/18163* (2013.01); *B60W 30/18159* (2020.02); *B60W 60/001* (2020.02);
(Continued)

(58) Field of Classification Search
CPC ..... B60W 30/18163; B60W 30/18159; B60W 60/001; B60W 2555/60; G01C 21/3407; G08G 1/0962
See application file for complete search history.

(56) References Cited

U.S. PATENT DOCUMENTS 6,265,991 B1 * 7/2001 Nishiwaki ............... G01S 7/295
340/904
2002/0076276 A1 * 6/2002 Troemel ................... E01C 1/02
404/1
(Continued)

FOREIGN PATENT DOCUMENTS

CN 110155059 A * 8/2019 ...... B60W 30/18145
JP 2013096744 A * 5/2013
(Continued)

*Primary Examiner* — Angelina Shudy
(74) *Attorney, Agent, or Firm* — Global IP Counselors, LLP

(57) ABSTRACT

A driving assist method minimizes an incidence of lane changing within a circulatory roadway. In this driving assist method, a recognition assessment processor assesses the travel of a host vehicle, calculates a travel route over which the host vehicle is to travel, and executes a driving assist control based on the travel route. The recognition assessment processor further assesses whether the host vehicle has arrived at a roundabout having a circulatory roadway to which three or more radial roadways are connected. When an assessment has been made that the host vehicle has arrived at the roundabout, a position of a host vehicle entrance and a position of a host vehicle exit are specified. Furthermore, an entrance position is set based on a positional relationship between the host vehicle entrance and the host vehicle exit.

13 Claims, 16 Drawing Sheets

(51) Int. Cl.
  *G01C 21/34* (2006.01)
  *G08G 1/0962* (2006.01)
(52) U.S. Cl.
  CPC ....... *G01C 21/3407* (2013.01); *G08G 1/0962*
  (2013.01); *B60W 2555/60* (2020.02)

(56) References Cited

U.S. PATENT DOCUMENTS

| | | | | |
|---|---|---|---|---|
| 2004/0210383 | A1* | 10/2004 | Sato | G08G 1/0969 |
| | | | | 701/469 |
| 2007/0083296 | A1* | 4/2007 | Tengler | G08G 1/096716 |
| | | | | 701/1 |
| 2007/0150182 | A1* | 6/2007 | Okusa | G01C 21/3658 |
| | | | | 340/995.13 |
| 2011/0071801 | A1* | 3/2011 | Carrasco | G06T 11/203 |
| | | | | 703/1 |
| 2012/0197525 | A1* | 8/2012 | Noro | G01C 21/3626 |
| | | | | 701/437 |
| 2015/0094945 | A1* | 4/2015 | Cheng | G01C 21/3461 |
| | | | | 701/408 |
| 2016/0091897 | A1* | 3/2016 | Nilsson | B60W 40/04 |
| | | | | 701/25 |
| 2016/0137060 | A1* | 5/2016 | Brandin | B60W 40/06 |
| | | | | 701/93 |
| 2016/0161271 | A1* | 6/2016 | Okumura | B60W 30/09 |
| | | | | 701/25 |
| 2016/0314358 | A1* | 10/2016 | Kushida | G06V 20/588 |
| 2017/0146355 | A1* | 5/2017 | Xu | G01C 21/3446 |
| 2017/0166124 | A1* | 6/2017 | Nakagawa | G08G 1/166 |
| 2018/0032082 | A1* | 2/2018 | Shalev-Shwartz | |
| | | | | G01C 21/3602 |
| 2018/0059670 | A1* | 3/2018 | Nilsson | B60W 30/09 |
| 2018/0111611 | A1 | 4/2018 | MacNeille et al. | |
| 2018/0273086 | A1* | 9/2018 | Jung | B62D 6/02 |
| 2019/0001993 | A1* | 1/2019 | Visintainer | G01C 21/30 |
| 2019/0078897 | A1* | 3/2019 | Sumizawa | G01C 21/32 |
| 2019/0225231 | A1* | 7/2019 | Ohara | G06K 9/6289 |
| 2019/0344791 | A1* | 11/2019 | Kim | B60W 30/17 |
| 2019/0359218 | A1* | 11/2019 | Pohl | G01S 13/931 |
| 2020/0035102 | A1* | 1/2020 | Satomura | G06V 20/582 |
| 2020/0074863 | A1* | 3/2020 | Jung | G08G 1/164 |
| 2020/0180612 | A1* | 6/2020 | Finelt | G06V 20/58 |
| 2020/0180618 | A1* | 6/2020 | Ohmura | B60W 60/0015 |
| 2020/0241523 | A1* | 7/2020 | Brandin | B60W 40/02 |
| 2020/0250438 | A1* | 8/2020 | Schachter | G01C 21/30 |
| 2020/0257301 | A1* | 8/2020 | Weiser | G06N 3/02 |
| 2020/0272159 | A1* | 8/2020 | Zhang | G05D 1/0221 |
| 2020/0320869 | A1* | 10/2020 | Malhan | G08G 1/07 |
| 2021/0070289 | A1* | 3/2021 | Yu | B60W 30/0956 |
| 2021/0158692 | A1* | 5/2021 | Uenoyama | H04W 4/44 |
| 2022/0161799 | A1* | 5/2022 | Da Silva | B60W 30/12 |

FOREIGN PATENT DOCUMENTS

| | | | |
|---|---|---|---|
| JP | 2014-065466 A | 4/2014 | |
| JP | 2018-503169 A | 2/2018 | |
| WO | 2005/098363 A1 | 10/2005 | |
| WO | 2006/109471 A1 | 10/2006 | |
| WO | WO-2006109471 A1 * | 10/2006 | ........ G01C 21/3658 |

* cited by examiner

DRIVING ASSIST METHOD AND DRIVING ASSIST DEVICE

CROSS-REFERENCE TO RELATED APPLICATIONS

This application is a U.S. national stage application of International Application No. PCT/IB2018/000877, filed on Jul. 11, 2018.

BACKGROUND

Technical Field

The present invention relates to a driving assist method and a driving assist device.

Background Information

In the past, driving assist methods for temporarily stopping a host vehicle at a location proximate to entering a circulatory roadway of a roundabout have been known (e.g., Japanese Laid-Open Patent Application No. 2018-503169 refer to as patent document 1).

SUMMARY

In prior-art driving assist methods, there is disclosed control of the traveling of a host vehicle when the host vehicle enters a circulatory roadway of a roundabout. However, no consideration has been given to a widthwise position of the host vehicle in an entrance through which the host vehicle passes when entering the circulatory roadway. Therefore, there is a risk that the host vehicle might need to change lanes while traveling in the circulatory roadway, and as a result, the travel of other vehicles would be obstructed.

The present disclosure was contrived in view of the problem described above, it being an object of the present disclosure to provide a driving assist method and a driving assist device with which an incidence of lane changing in a circulatory roadway can be minimized.

In order to achieve the object described above, the present disclosure is a driving assist method comprising providing a controller that calculates a target route over which a host vehicle is caused to travel and executes driving assist control based on the target route, the method assisting with travel of the host vehicle. In this driving assist method, an assessment is made as to whether the host vehicle has arrived at a roundabout having a circulatory roadway to which three or more radial roadways are connected. When it has been assessed that the host vehicle has arrived at the roundabout, a position of an entrance where the host vehicle enters the circulatory roadway and a position of an exit where the host vehicle exits the circulatory roadway are specified. An entrance position, which is a widthwise position of the host vehicle in the entrance, is set based on a positional relationship between the entrance and the exit.

Consequently, in the present disclosure, it is possible to minimize the incidence of lane changing in a circulatory roadway.

BRIEF DESCRIPTION OF THE DRAWINGS

Referring now to the attached drawings which form a part of this original disclosure.

DETAILED DESCRIPTION OF EMBODIMENTS

Figure 1:
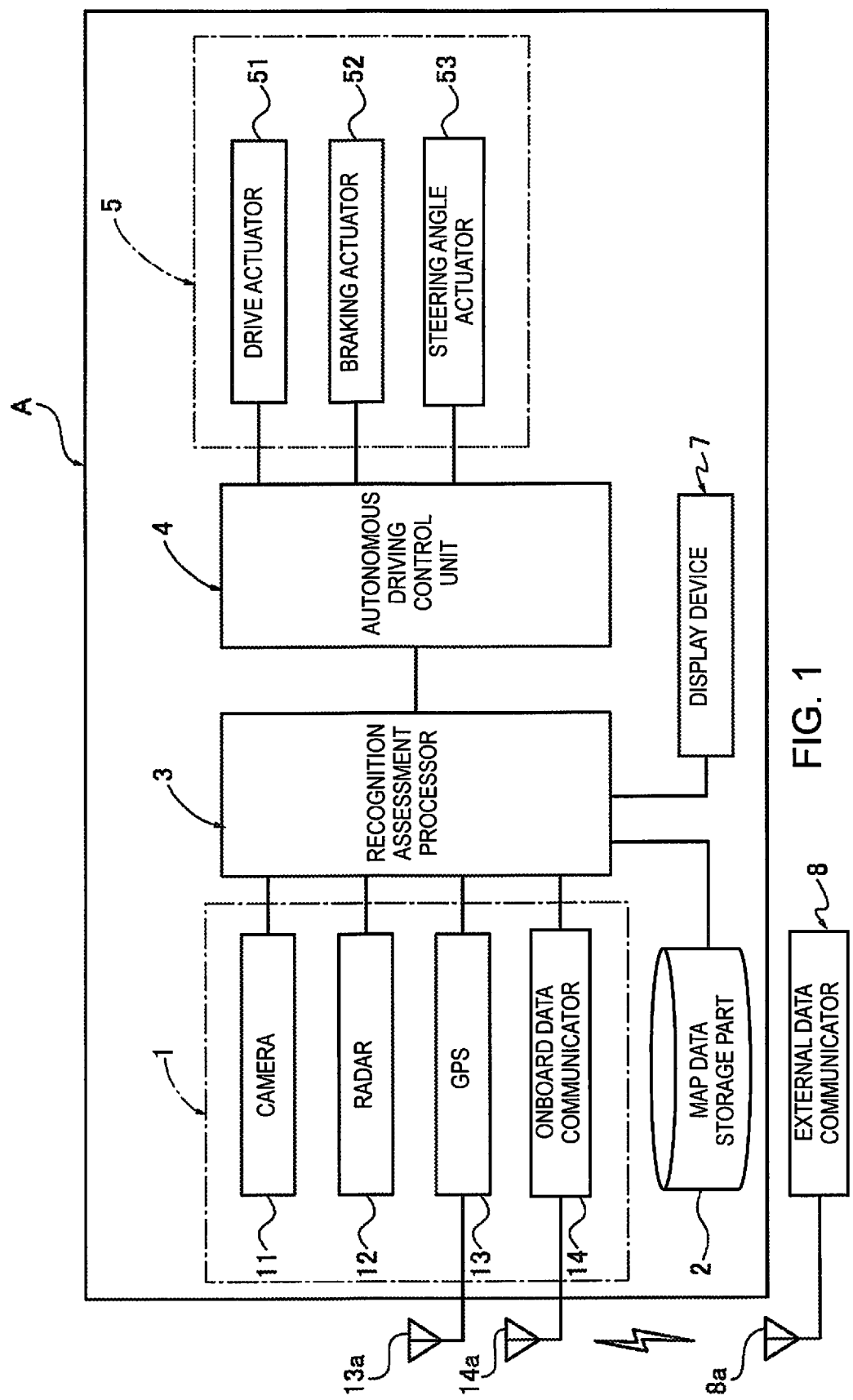
FIG. 1 is an overall system diagram of an autonomous driving control system to which a driving assist method and a driving assist device are applied in accordance with a first embodiment.

A preferred embodiment of the driving assist method and driving assist device of the present invention is described below based on the first embodiment shown in the drawings.

First Embodiment

A driving assist method and driving assist device of the first embodiment are applied to an autonomously driven vehicle (one example of a travel-assisted vehicle; a host vehicle) in which target route information (travel route information) generated by a recognition assessment processor is used, and for which drive/braking/steering are autonomously controlled by selection of an autonomous driving mode. The configurations in the first embodiment are described below in each of "Overall System Configuration," "Control block Configuration Of Recognition Assessment Processor," "Configuration of Process For Driving Assist Control," "Configuration Of Process For First Entrance Position Setting Control," "Configuration Of Process For Second Entrance Position Setting Control," "Configuration of Process For Third Entrance Position Setting Control," and "Configuration of Process For Fourth Entrance Position Setting Control."

Overall System Configuration

An autonomous driving system A is provided with an onboard sensor 1, a map data storage part 2, a recognition assessment processor 3 (controller), an autonomous driving control part 4, an actuator 5, and a display device 7, as shown in FIG. 1.

The onboard sensor 1 has a camera 11, a radar 12, a GPS 13, and an onboard data communicator 14. Sensor information acquired by the onboard sensor 1 is outputted to the recognition assessment processor 3.

The camera 11 is a surroundings recognition sensor that carries out a function of acquiring host vehicle surroundings information such as lanes, preceding vehicles, and pedestrians from image data, as a function needed for autonomous driving. The camera 11 is configured by combining, for example, a host vehicle forward recognition camera, a rearward recognition camera, a rightward recognition camera, a leftward recognition camera, etc.

Objects on the host vehicle travel roadway, lanes, objects outside of the host vehicle travel roadway (road structures, preceding vehicles, succeeding vehicles, oncoming vehicles, surrounding vehicles, pedestrians, bicycles, motorcycles), the host vehicle travel roadway (white road lines, road borders, stop lines, crosswalks), road signs (speed limits), etc., are sensed by the camera 11.

The radar 12 is a distance measurement sensor that carries out a function of sensing the presence of objects in the surroundings of the host vehicle and the function of sensing distances to objects in the surroundings of the host vehicle, as functions needed for autonomous driving. "Radar 12" in this example is a general term including radar using radio waves, lidar using light, and sonar using ultrasonic waves. For example, laser radar, milliwave radar, ultrasonic radar, a laser range finder, etc., can be used as the radar 12. The radar 12 is configured by combining, for example, host vehicle forward radar, rearward radar, rightward radar, leftward radar, etc.

Positions of objects on the host vehicle travel roadway, objects outside of the host vehicle travel roadway (road structures, preceding vehicles, succeeding vehicles, oncoming vehicles, surrounding vehicles, pedestrians, bicycles, motorcycles), etc., are sensed and distances to the objects are sensed by the radar 12. If a viewing angle is insufficient, viewing angle may be added as appropriate.

The GPS 13 is a host vehicle position sensor that has a GNSS antenna 13a and uses satellite communication to sense the host vehicle position (latitude and longitude) while the host vehicle is stopped or traveling. "GNSS" is an abbreviation of "Global Navigation Satellite System," and "GPS" is an abbreviation of "Global Positioning System."

The onboard data communicator 14 is an external data sensor that wirelessly communicates with an external data communicator 8 via transceiver antennas 8a, 14a, and thereby acquires, from an external source, information that cannot be acquired from the host vehicle.

In cases where the external data communicator 8 is, for example, a data communicator installed in another vehicle traveling in the vicinity of the host vehicle, the onboard data communicator 14 performs vehicle-to-vehicle communication between the host vehicle and the other vehicle. The onboard data communicator 14 can, by self-initiated request, acquire information necessary to the host vehicle from among a variety of information held in the other vehicle, the acquisition being performed via the vehicle-to-vehicle communication.

In cases where the external data communicator 8 is, for example, a data communicator provided to infrastructure equipment, the onboard data communicator 14 performs vehicle-to-infrastructure communication between the host vehicle and the infrastructure equipment. The onboard data communicator 14 can, by self-initiated request, acquire information necessary to the host vehicle from among a variety of information held in the infrastructure equipment, the acquisition being performed via the vehicle-to-infrastructure communication. Thus, in cases where the held information has, e.g., information that map data saved in the map data storage part 2 lacks, or information changed from that in the map data, it is possible for the lacking information/changed information to be supplementarily provided. In addition, it is possible to acquire traffic information, such as congestion information or travel restriction information, pertaining to a target route on which the host vehicle is planned to travel.

The map data storage part 2 is configured from an onboard memory that contains "electronic map data," in which map information and latitude/longitude are associated. When the host vehicle position sensed by the GPS 13 is recognized as host vehicle position information by the recognition assessment processor 3, the map data storage part 2 sends map data centered on the host vehicle position to the recognition assessment processor 3.

The map data has road information associated with individual locations, the road information being defined by nodes and links that connect the nodes. The road information includes: information that specifies the road according to the position/area of the road; and information pertaining to road identification for each road, a road width for each road, and a road shape. The road information is stored, for each item of identification information pertaining to the road links, in association with other information relating to intersections, such as the position of an intersection, an entry direction of the intersection, and a classification of the intersection. In addition, the road information is stored, for each item of identification information pertaining to the road links, in association with other information relating to roads, such as road classification, road width, road shape, the possibility of advancing straight forward, a priority relationship pertaining to advancement, the possibility of passing other vehicles (possibility of entering an adjacent lane), speed limits, and road signs.

The recognition assessment processor 3 performs integrated processing on input information (host vehicle surroundings information, host vehicle position information, map data information, destination information, etc.) from the onboard sensor 1 or the map data storage part 2, and generates a target route (travel route), a target vehicle speed profile (including an acceleration profile and/or a deceleration profile), etc. The generated target route information and target speed profile information are outputted to the autonomous driving control part 4 together with the host vehicle position information, etc. Specifically, the recognition assessment processor 3 generates a target route from a current location to a destination based on, inter alia, road information from the map data storage part 2 or a route search method, and generates a target speed profile, etc., aligned with the generated target route. When an assessment has been made that autonomous driving cannot be maintained according to the result of the host vehicle surroundings being sensed by the onboard sensor 1 while the host vehicle is stopped or is traveling along the target route, the recognition assessment processor 3 successively corrects the target route, the target speed profile, etc., based on the results from the sensing of the host vehicle surroundings. The target route is referred to as the target route even upon having been corrected. Specifically, the target route also includes a corrected route.

Furthermore, when the host vehicle has arrived at a roundabout 100 (see FIG. 2), the recognition assessment processor 3 performs entrance position setting control to set a widthwise position of a host vehicle V in a host vehicle entrance 105*a* (referred to below as an "entrance position"), and generates entrance position information. A target travel position is then set based on the entrance position information. Target travel position information is outputted along with host vehicle position information, etc., to the autonomous driving control unit 4. The "target travel position" is a host vehicle position that is a target for the host vehicle V in the travel roadway. When the entrance position is set, the recognition assessment processor 3 assesses whether or not a lane change toward the set entrance position can be executed and generates lane-change possibility information, which is the result of assessing whether or not a lane change is possible, based on the result of sensing the surroundings of the host vehicle and the host vehicle position information. The target travel position is then reset based on the lane-change possibility information.

Figure 2:
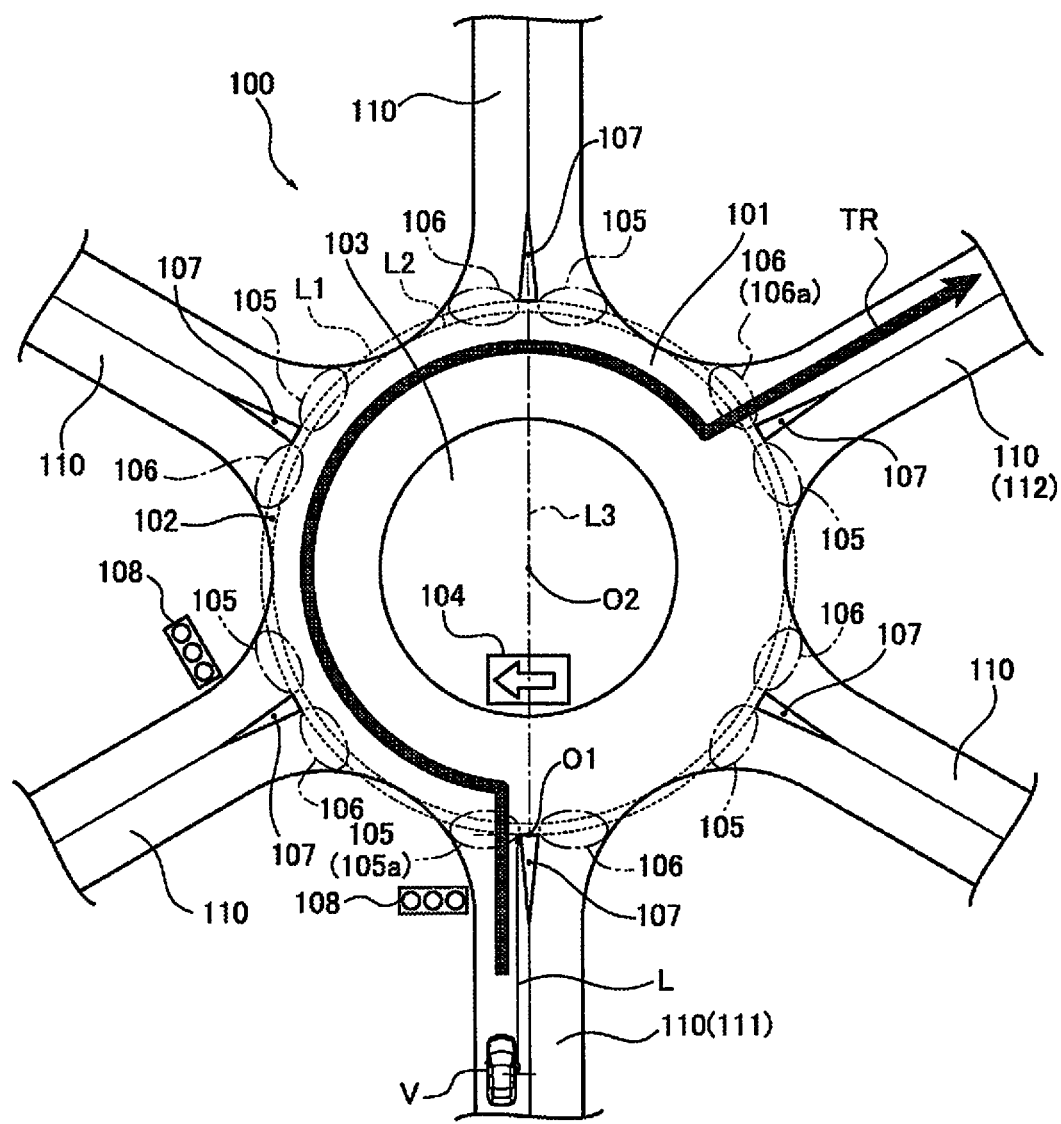
FIG. 2 is a schematic diagram of a roundabout.

The "roundabout 100" is a type of intersection at which a vehicle traveling on a travel roadway is to yield to a vehicle traveling on a prioritized roadway with which the travel roadway intersects. As shown in FIG. 2, the "roundabout 100" is a circular intersection having an annular circulatory roadway 101 (area enclosed by dashed line L2, prioritized roadway) to which three or more (six in FIG. 3) radial roadways 110 (travel roadways) are connected. Specifically, the roundabout 100 is an area enclosed by a dashed line L1, including a circulatory roadway 101 and connection sections 102 between the circulatory roadway 101 and the radial roadways 110.

A round central island 103 is provided in the center of the circulatory roadway 101. Vehicles are prohibited from traveling on the central island 103. Vehicles can pass by in one direction on the circulatory roadway 101. The direction of travel in the circulatory roadway 101 is clockwise in the case of left-side traffic, and counterclockwise in the case of right-side traffic. A sign 104 indicating the direction of travel in the circulatory roadway 101 may be disposed on the central island 103.

The connecting part 102 is an area of the circulatory roadway 101 that has a prescribed length radially outward from the border (dashed line L2) between the circulatory roadway 101 and the radial roadways 110. Sections of the connecting part 102 where vehicles enters the circulatory roadway 101 are referred to as "entrances 105," and seconds of the connecting part 102 where vehicles exit the circulatory roadway 101 are referred to as "exits 106." Furthermore, hereinafter, the entrance 105 that the host vehicle V passes through when entering the circulatory roadway 101 is referred to as a "host vehicle entrance 105*a*," and the exit 106 that the host vehicle V passes through when exiting the circulatory roadway 101 is referred to as a "host vehicle exit 106*a*."

Among the radial roadways 110, the radial roadway on which the host vehicle V is traveling when entering the circulatory roadway 101 is referred to as an "entry roadway 111," and the radial roadway on which the host vehicle V is traveling when exiting the circulatory roadway 101 is referred to as a "exit roadway 112." Specifically, the entry roadway 111 is a radial roadway 110 having a host vehicle entrance 105*a*, and the exit roadway 112 is a radial roadway 110 having a host vehicle exit 106*a*. The host vehicle entrance 105*a*, the host vehicle exit 106*a*, the entry roadway 111, and the exit roadway 112 are all defined based on the target route (travel route) TR of the host vehicle V.

The roundabout 100 is an intersection where vehicles traveling on the radial roadways 110 yield to vehicles traveling on the circulatory roadway 101. Therefore, in this roundabout 100, vehicles about to enter the circulatory roadway 101 must not hinder the passage of vehicles traveling on the circulatory roadway 101, and when a vehicle in the circulatory roadway 101 is traveling toward an entrance 105, a vehicle entering the circulatory roadway 101 must stop at that entrance 105.

Splitter islands 107 raised up from roadway surfaces between the entrances 105 and the exits 106 may be provided in the roundabout 100, as shown in FIG. 2. The splitter islands 107 are used for splitting vehicles entering the circulatory roadway 101 and vehicles exiting the circulatory roadway 101. Furthermore, as shown in FIG. 2, traffic signals 108 for controlling the entry of vehicles to the circulatory roadway 101 may be disposed close to the entrances 105.

The autonomous driving control part 4 computes, based on input information from the recognition assessment processor 3, a drive command value, a braking command value, or a steering angle command value that causes the host vehicle to travel or stop under autonomous driving aligning with the target route and/or the target travel position. A result from the computing of the drive command value is outputted to a drive actuator 51, a result from the computing of the braking command value is outputted to a braking actuator 52, and a result from the computing of the steering command value is outputted to a steering angle actuator 53.

The actuator 5 is control actuator that causes the host vehicle to travel/stop so as to align with the target route and/or the target travel position based on a control command inputted from the autonomous driving control part 4, or for causing the host vehicle to travel toward a set entrance position. The actuator 5 has the drive actuator 51, the braking actuator 52, and the steering angle actuator 53.

The drive actuator 51 is an actuator that receives input of a drive command value from the autonomous driving control part 4 and controls drive force outputted to drive wheels. As the drive actuator 51, for example, an engine is used in the case of an engine vehicle, an engine and a motor/generator (drive force) are used in the case of a hybrid vehicle, and a motor/generator (drive force) is used in the case of an electric automobile.

The braking actuator 52 is an actuator that receives input of a braking command value from the autonomous driving control part 4 and controls braking force outputted to the drive wheels. For example, a hydraulic booster, an electric booster, a brake fluid pressure actuator, a brake motor actuator, a motor/generator (regenerative), etc., is used as the braking actuator 52.

The steering angle actuator 53 is an actuator that receives input of a steering angle command value from the autonomous driving control part 4 and controls the steering angle of steered wheels. A turning motor, etc., provided to a steering force transmission system of a steering system is used as the steering angle actuator 53.

The display device 7 is a device that displays a screen image pertaining to, inter alia, where on a map the host vehicle is moving while the host vehicle is stopped or traveling under autonomous driving, and provides visual information pertaining to the host vehicle position to a driver and/or a passenger. The display device 7 receives input of the target route information, the host vehicle position information, the destination information, etc., generated by the recognition assessment processor 3, and displays a map, roads, the target route, the host vehicle position, the destination, etc., in a visually recognizable manner on the display screen image.

Control Block Configuration of Recognition Assessment Processor

Figure 3:
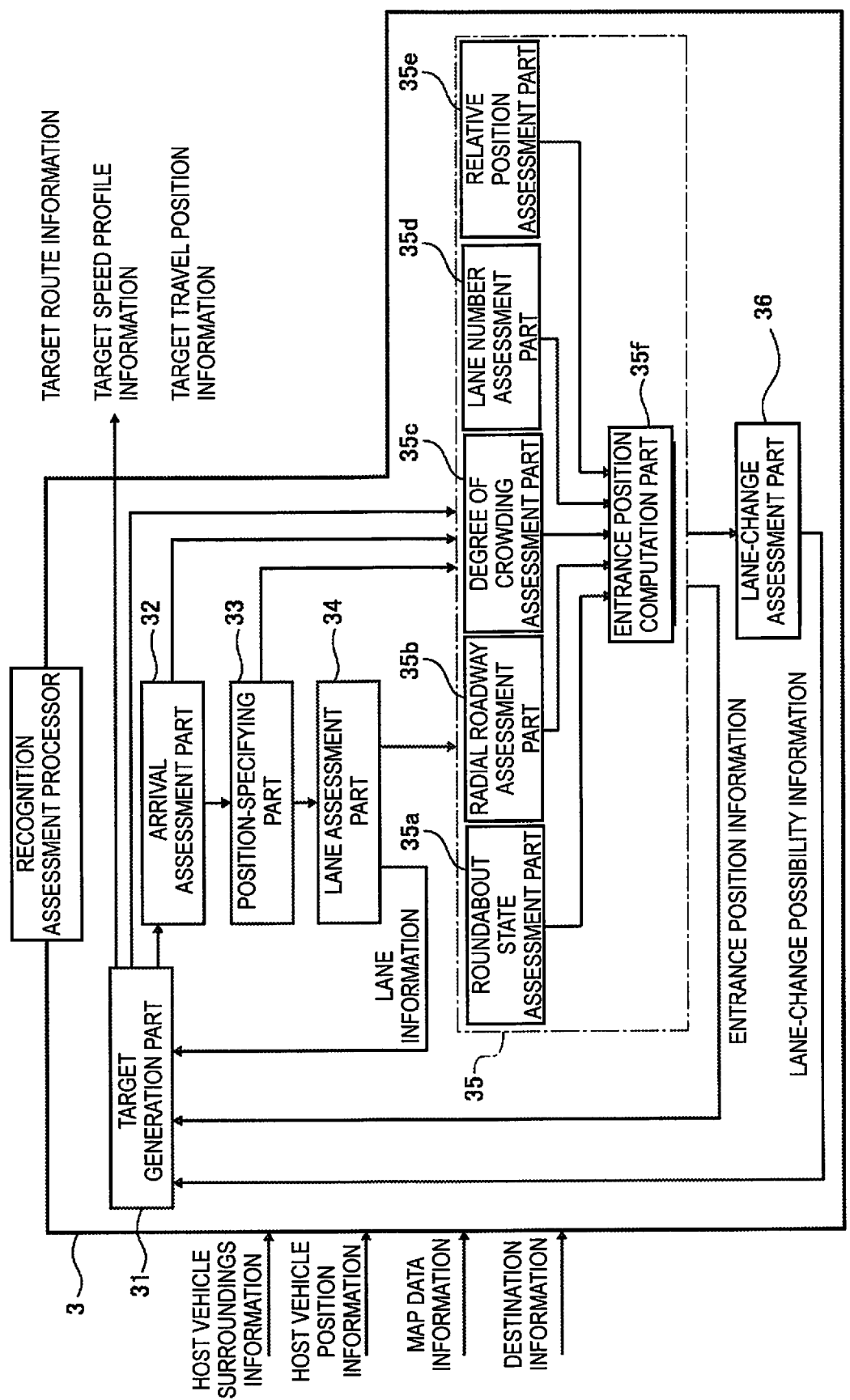
FIG. 3 is control block diagram of a recognition assessment processor of the first embodiment.

The recognition assessment processor 3 is provided with a target generation part 31, an arrival assessment part 32, a position-specifying part 33, a lane assessment part 34, an entrance-position-setting part 35, and a lane-change assessment part 36, as shown in FIG. 3.

The target generation part 31 receives input of host vehicle surroundings information, host vehicle position information, map data information, destination information, etc. Furthermore, the target generation part 31 receives input of lane information assessed by the lane assessment part 34, entrance position information set by the entrance-position-setting part 35, and lane-change possibility information assessed by the lane-change assessment part 36. In the target generation part 31, a target route, a target vehicle speed profile, a target travel position, etc., are generated based on the various pieces of inputted information. The various pieces of target information generated by the target generation part 31 are outputted to the arrival assessment part 32, the entrance-position-setting part 35, and the autonomous driving control unit 4.

The arrival assessment part 32 receives input of the host vehicle position information, the map data information, the target route information, etc. In the arrival assessment part 32, an assessment is made as to whether the host vehicle V has arrived at a roundabout 100. A result of the assessment by the arrival assessment part 32 and the target route information are outputted to the position-specifying part 33 and the entrance-position-setting part 35. An assessment that the host vehicle V has arrived at the roundabout 100 is made according to whether a distance L along the target route from the host vehicle V to a widthwise center position in the host vehicle entrance 105a (FIG. 2) has become equal to or less than a prescribed threshold value distance. The "distance L" is computed based on the host vehicle position information and information pertaining to the roundabout 100 obtained from the map data information. The "threshold value distance" is a distance in which the host vehicle V can make at least one lane change before arriving at the host vehicle entrance 105a, and is, for example, 100-300 m. The "threshold value distance" may be changed in accordance with a travel speed of the host vehicle V.

The position-specifying part 33 receives input of the result of the assessment performed by the arrival assessment part 32, the target route information, the map data information, etc. In the position-specifying part 33, the position of the host vehicle entrance 105a and the position of the host vehicle exit 106a in the roundabout 100 are specified. Position information of the host vehicle entrance 105a and position information of the host vehicle exit 106a specified by the position-specifying part 33 are outputted to the lane assessment part 34 and the entrance-position-setting part 35.

The lane assessment part 34 receives input of the position information of the host vehicle entrance 105a from the position-specifying part 33, the map data information, etc. The lane assessment part 34 assesses whether or not the host vehicle entrance 105a has a plurality of lanes lined up in a vehicle-width direction. A result of the assessment of the lane assessment part 34 (lane information) is outputted to the target generation part 31 and the entrance-position-setting part 35.

"Lanes" are travelable areas that are lined up in the vehicle-width direction on the travel roadway. For example, in cases where white road lines are provided on the surface of the travel roadway, an area that extends in alignment with the travel roadway and is demarcated by the white road lines corresponds to a single lane. When a plurality of areas demarcated by white road lines are lined up in the vehicle-width direction, it is assessed that there are "a plurality of lanes." In cases in which white road lines are not provided on the surface of the travel roadway, it is assessed that there are "a plurality of lanes" when the travel roadway has a width dimension that enables a plurality of vehicle to travel while lined up in the vehicle-width direction. Specifically, if the host vehicle entrance 105a is demarcated by white road lines, the assessment as to whether there are a plurality of lanes is made with reference to the white road lines as a reference. When the host vehicle entrance 105a is not demarcated by white road lines, the assessment as to whether there are a plurality of lanes is made with reference to the width dimension of the host vehicle entrance 105a.

The entrance-position-setting part 35 receives input of the target route information, the result of the assessment performed by the arrival assessment part 32, the position information of the host vehicle entrance 105a and the position information of the host vehicle exit 106a from the position-specifying part 33, and the result of the assessment performed by the lane assessment part 34. In the entrance-position-setting part 35, the "entrance position," which is the widthwise position of the host vehicle V in the host vehicle entrance 105a, is set and entrance position information is generated based on the various pieces of inputted information. The entrance position information generated by the entrance-position-setting part 35 is outputted to the target generation part 31 and the lane-change assessment part 36. The entrance-position-setting part 35 has a roundabout state assessment part 35a, a radial roadway assessment part 35b, a degree of crowding assessment part 35c, a lane number assessment part 35d, a relative position assessment part 35e, and an entrance position computation part 35f.

The roundabout state assessment part 35a receives input of the result of the assessment performed by the arrival assessment part 32, the host vehicle position information, the map data information, the target route information, etc. In the roundabout state assessment part 35a, the matters enumerated below are assessed in regard to the roundabout 100 at which the host vehicle V has arrived.

whether or not an outer diameter dimension of the circulatory roadway 101 is equal to or greater than a first prescribed value whether or not a width dimension of the circulatory roadway 101 is equal to or greater than a second prescribed value whether or not there is a traffic signal 108 in a position close to the host vehicle entrance 105a The result of the assessment performed by the roundabout state assessment part 35a is outputted to the entrance position computation part 35f. The "first prescribed value" is a value at which it is possible to ensure the travel distance needed for the host vehicle V to make a lane change in the circulatory roadway 101 between entering and exiting the circulatory roadway 101, e.g., 60 m. The "second prescribed value" is a value at which a lane change in the circulatory roadway 101 can be made, e.g., 10 m (corresponding to three lanes). Furthermore, the traffic signal 108 is a traffic signal that controls the entry of vehicles when vehicles are entering the circulatory roadway 101 through the host vehicle entrance 105a.

The radial roadway assessment part 35b receives input of the position information of the host vehicle entrance 105a, the position information of the host vehicle exit 106a, the map data information, etc. The radial roadway assessment part 35b assesses whether or not a plurality of radial roadways 110 connected to the circulatory roadway 101 are present between the host vehicle entrance 105a and the host vehicle exit 106a in the roundabout 100 at which the host vehicle V has arrived. The result of the assessment performed by the radial roadway assessment part 35b is outputted to the entrance position computation part 35f. The phrase "between the host vehicle entrance 105a and the host vehicle exit 106a" refers to an area interposed between the host vehicle entrance 105a and the host vehicle exit 106a as seen along the advancing direction in the circulatory roadway 101.

The degree of crowding assessment part 35c receives input of the position information of the host vehicle entrance 105a, the position information of the host vehicle exit 106a, host vehicle surroundings information, the map data information, etc. The degree of crowding assessment part 35c assesses whether or not a radial roadway 110 connected to the circulatory roadway 101 is present between the host vehicle entrance 105a and the host vehicle exit 106a. Furthermore, the degree of crowding of vehicles entering the circulatory roadway 101 from the radial roadway 110 present in the area between the host vehicle entrance 105a and the host vehicle exit 106a is computed, and a height of this degree of crowding for entry is assessed. Information needed when computing the degree of crowding for entry (for example, a situation such as that of other vehicles entering the circulatory roadway 101 from a radial roadway 110) may be acquired by the onboard sensor 1, or may be acquired via the external data communicator 8 for VICS information, etc. The result of the assessment performed by the degree of crowding assessment part 35c is outputted to the entrance position computation part 35f. The phrase "between the host vehicle entrance 105a and the host vehicle exit 106a" refers to an area interposed between the host vehicle entrance 105a and the host vehicle exit 106a as seen along the advancing direction in the circulatory roadway 101.

The lane number assessment part 35d receives input of the result of the assessment performed by the lane assessment part 34, the result of the assessment performed by the roundabout state assessment part 35a, the map data information, etc. The lane number assessment part 35d assesses whether or not the host vehicle entrance 105a has two lanes lined up in the width direction. The result of the assessment performed by the lane number assessment part 35d is outputted to the entrance position computation part 35f.

The relative position assessment part 35e receives input of the position information of the host vehicle entrance 105a, the position information of the host vehicle exit 106a, the host vehicle surroundings information, the map data information, etc. The relative position assessment part 35e assesses a relative positional relationship between the host vehicle entrance 105a and the host vehicle exit 106a. The relative position information assessed and obtained by the relative position assessment part 35e is outputted to the entrance position computation part 35f. The relative positional relationship between the host vehicle entrance 105a and the host vehicle exit 106a is assessed based on the position of the host vehicle exit 106a relative to a front-facing direction of the host vehicle entrance 105a. Specifically, the relative position assessment part 35e assesses whether the host vehicle exit 106a is present in an area to the left of the front-facing direction of the host vehicle entrance 105a, the host vehicle exit 106a is present in an area to the right of the front-facing direction of the host vehicle entrance 105a, or the host vehicle exit 106a is present along the front-facing direction of the host vehicle entrance 105a.

The "front-facing direction of the host vehicle entrance 105a" is a direction (referred to below as "front-facing direction L3") shown by center line L3, which links a widthwise center position O1 of the entry roadway 111 and a center position O2 of the circulatory roadway 101; refer to FIG. 2. The phrase "the host vehicle exit 106a is present in an area to the left of the front-facing direction of the host vehicle entrance 105a" refers to a case in which, facing in the advancing direction of the host vehicle V, the exit roadway 112 is present in an area to the left of the front-facing direction L3. The phrase "the host vehicle exit 106a is present in an area to the right of the front-facing direction of the host vehicle entrance 105a" refers to a case in which, facing in the advancing direction of the host vehicle V, the exit roadway 112 is present in an area to the right of the front-facing direction L3. Furthermore, the phrase "the host vehicle exit 106a is present along the front-facing direction of the host vehicle entrance 105a" refers to a state in which the front-facing direction L3 and the exit roadway 112 overlap. The case shown in FIG. 2 is a case in which "the host vehicle exit 106a is present in an area to the right of the front-facing direction of the host vehicle entrance 105a."

The entrance position computation part 35f receives input of the result of the assessment performed by the roundabout state assessment part 35a, the result of the assessment performed by the radial roadway assessment part 35b, the result of the assessment performed by the degree of crowding assessment part 35c, the result of the assessment performed by the lane number assessment part 35d, and the relative position information from the relative position assessment part 35e. The entrance position computation part 35f sets an entrance position, which is the widthwise position of the host vehicle V in the host vehicle entrance 105a, based on the positional relationship between the host vehicle entrance 105a and the host vehicle exit 106a. The entrance position could be set by the entrance position computation part 35f based on the relative positional relationship between the host vehicle entrance 105a and the host vehicle exit 106a, and also could be set based on the presence of radial roadways 110 obtained from the positional relationship between the host vehicle entrance 105a and the host vehicle exit 106a.

The lane-change assessment part 36 receives input of the entrance position information from the entrance-position-setting part 35, the host vehicle surroundings information, the host vehicle position information, etc. Based on the host vehicle surroundings information, the host vehicle position information, etc., the lane-change assessment part 36 assesses whether or not the host vehicle V can smoothly execute a lane change toward the entrance position set in the entrance-position-setting part 35 before arriving at the host vehicle entrance 105*a*. The lane-change possibility information generated by the lane-change assessment part 36 is outputted to the target generation part 31. Cases in which smooth lane change execution is not possible include, for example, cases in which there is another vehicle adjacent to the host vehicle V, cases in which there is another vehicle in a movement target location, etc.

Configuration of Process for Driving Assist Control

Figure 4:
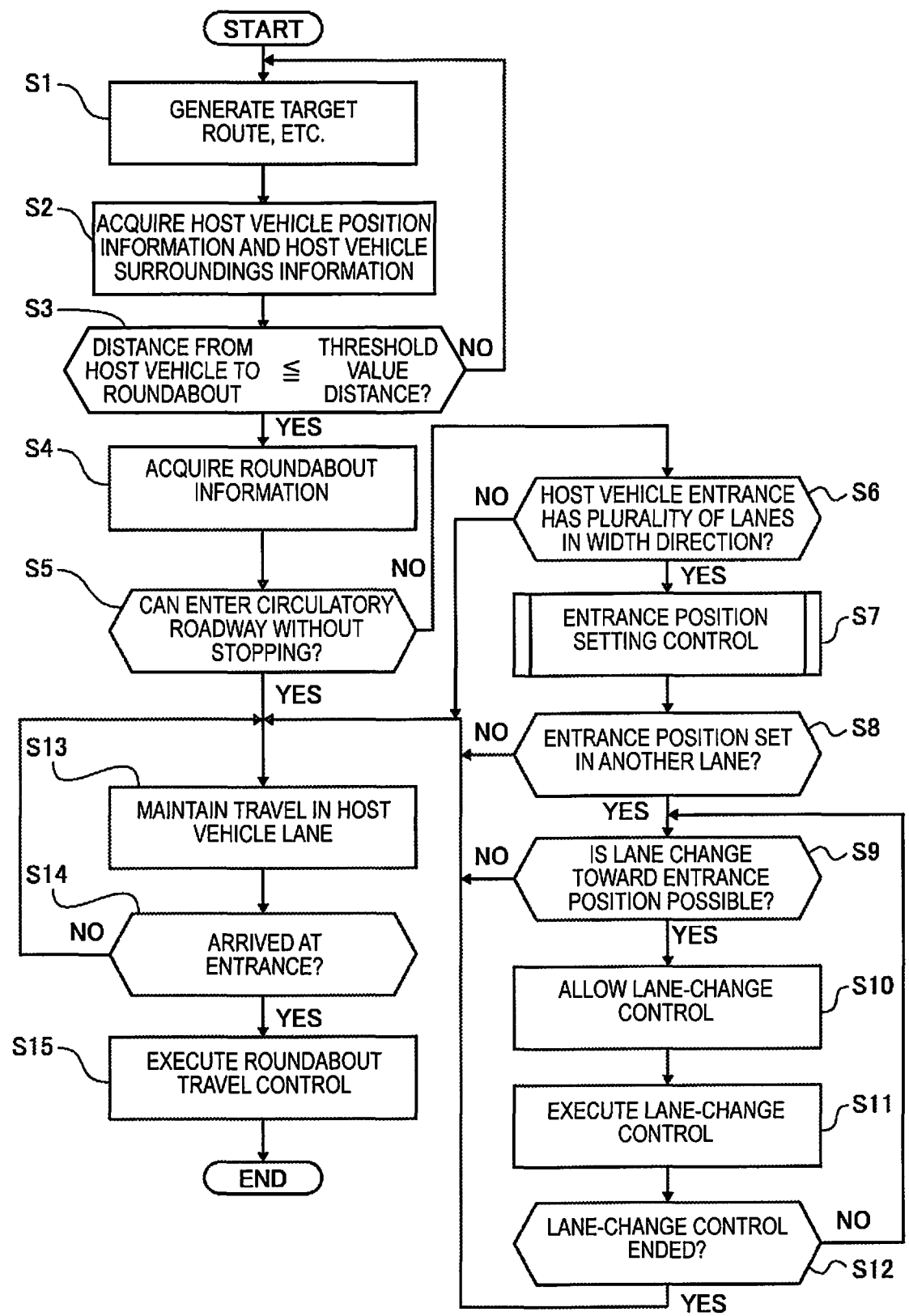
FIG. 4 is a flowchart of a flow of driving assist control executed by the recognition assessment processor of the first embodiment.

FIG. 4 is a flowchart of a flow of driving assist control. The steps of FIG. 4 are described below.

In step S1, a target route, etc., is generated based on the host vehicle surroundings information, the host vehicle position information, the map data information, the target destination, etc., and the process advances to step S2. Step S1 corresponds to the target generation part 31.

In step S2, in continuation from the generation of the target route, etc., in step S1, the host vehicle position information and the host vehicle surroundings information are acquired from the onboard sensor 1 during travel, and the process advances to step S3.

In step S3, in continuation from the acquisition of the host vehicle position information and the host vehicle surroundings information in step S2, an assessment is made as to whether a distance from the host vehicle V to the roundabout 100 has come to be equal to or less than the threshold value distance, or Specifically, whether or not the host vehicle V has arrived at the roundabout 100. When the assessment is YES (arrived at roundabout), the process advances to step S4. When the assessment is NO (not arrived at roundabout), the process returns to step S1. The distance from the host vehicle V to the roundabout 100 is assessed based on the host vehicle position information, the map data information, etc. Step S3 corresponds to the arrival assessment part 32.

In step S4, in continuation from the assessment in step S3 that the host vehicle has arrived at the roundabout, information pertaining to the roundabout 100 at which the host vehicle V has arrived is acquired from the target route information, the host vehicle position information, the map data information, etc., and the process advances to step S5. The "information pertaining to the roundabout 100" is various pieces of information needed to specify the position of the host vehicle entrance 105*a* and the position of the host vehicle exit 106*a* or to set the entrance position, such as position information of the host vehicle entrance 105*a*, position information of the host vehicle exit 106*a*, outer diameter dimension information of the circulatory roadway 101, width dimension information of the circulatory roadway 101, information of traffic signal installation close to the entrance, position information of the radial roadways 110, and situations of other vehicles traveling on the radial roadways 110. Step S4 corresponds to the position-specifying part 33.

In step S5, in continuation from the acquisition of the roundabout information in step S4, an assessment is made as to whether the host vehicle V can enter the circulatory roadway 101 without stopping at the host vehicle entrance 105*a*, the assessment being made based on the host vehicle position information, the host vehicle surroundings information, etc. When the assessment is YES (can enter the circulatory roadway without stopping), the process advances to step S13. When the assessment is NO (it is impossible to enter the circulatory roadway without stopping), the process advances to step S6. The phrase "can enter the circulatory roadway without stopping" refers to cases where no preceding vehicle is present in the host vehicle entrance 105*a* and no other vehicle heading toward the host vehicle entrance 105*a* is present in the circulatory roadway 101. Even if a preceding vehicle is present in the host vehicle entrance 105*a* at the time of computation, it is assessed that "no preceding vehicle is present in host vehicle entrance 105*a*" if it can be predicted that the preceding vehicle will enter the circulatory roadway 101 before the host vehicle V arrives at the host vehicle entrance 105*a*.

In step S6, in continuation from the assessment in step S5 that it is impossible for the host vehicle to enter the circulatory roadway without stopping, an assessment is made as to whether the host vehicle entrance 105*a*, which the host vehicle V passes through when entering the circulatory roadway 101, has a plurality of lanes lined up in the width direction. When the assessment is YES (there are a plurality of lanes), the process advances to step S7. When the assessment is NO (there is a single lane), the process advances to step S13. The lanes of the host vehicle entrance 105*a* are assessed based on the position information of the host vehicle entrance 105*a*, the map data information, the image data acquired by the camera 11, etc. Step S6 corresponds to the lane assessment part 34.

In step S7, in continuation from the assessment in step S6 that the host vehicle entrance 105*a* has a plurality of lanes, entrance position setting control is executed, an "entrance position" is set, the entrance position being the widthwise position of the host vehicle V in the host vehicle entrance 105*a*, the lane in which the entrance position is set is specified, and the process advances to step S8. Entrance position setting control is a process in which the position of the host vehicle entrance 105*a* and the position of the host vehicle exit 106*a* are specified, and an entrance position is set based on the positional relationship between the host vehicle entrance 105*a* and the host vehicle exit 106*a*. This entrance position setting control includes first entrance position setting control shown in FIG. 5, second entrance position setting control shown in FIG. 6, third entrance position setting control shown in FIG. 7, and fourth entrance position setting control shown in FIG. 8. The first, second, and third entrance position setting controls are executed in parallel. The fourth entrance position setting control is executed when, as a result of the execution of the first, second, and third entrance position setting controls, a step for executing the fourth entrance position setting control has been selected in all processes. Step S7 corresponds to the entrance-position-setting part 35.

In step S8, in continuation from the setting of the entrance position in step S7, an assessment is made as to whether the entrance position set in step S7 has been set in a lane (another lane) other than a host vehicle lane. When the assessment is YES (entrance position is set in another lane), the process advances to step S9. When the assessment is NO (entrance position is set in host vehicle lane), the process advances to step S13. The "host vehicle lane" is a lane coinciding with an extending line that extends along the travel roadway from the current position of the host vehicle V. The positional relationship between the host vehicle lane and the entrance position set in step S7 is assessed based on the host vehicle position information, the entrance position information, etc.

In step S9, in continuation from the assessment in step S8 that the entrance position is set in another lane, an assessment is made as to whether a lane change toward the entrance position can be executed. When the assessment is YES (lane change is possible), the process advances to step S10. When the assessment is NO (lane change is not possible), the process advances to step S13. The assessment as to whether the lane change can be executed is made based on the entrance position information, the presence of adjacent vehicles as obtained from information such as the host vehicle surroundings information and the host vehicle position information, the situation of the host vehicle surroundings such as the distance to the host vehicle entrance 105a, and the host vehicle situation. A "lane change toward the entrance position" is a lane change in which the host vehicle V is caused to move to a lane in which the entrance position set in step S7 has been set (a lane on which the host vehicle would travel to arrive at the entrance position; referred to below as a "target lane").

In step S10, in continuation from the assessment in step S9 that a lane change is possible, execution of lane-change control is permitted and the process advances to step S11. Steps S9 and S10 correspond to the lane-change assessment part 36.

In step S11, in continuation from the allowance of lane-change control execution in step S10, lane-change control is executed and the process advances to step S12. In "lane-change control," the recognition assessment processor 3 generates a target travel position to which the host vehicle V heads in the target lane from the current position, and outputs target travel position information to the autonomous driving control unit 4. The autonomous driving control unit 4 generates a command value to perform autonomous driving in alignment with the target travel position based on the target travel position information, and outputs this command value to the actuator 5. The host vehicle V is then caused to travel/stop by the actuator 5 so as to align with the target travel position. This lane-change control is a well-known control and shall therefore not be described in detail.

In step S12, in continuation from the execution of lane-change control in step S11, an assessment is made as to whether the lane-change control is complete. When the assessment is YES (control is complete), the process advances to step S13. When the assessment is NO (control is continuing), the process returns to step S9. The assessment that "lane-change control is complete" is made due to the host vehicle V having moved to the target lane.

In step S13, in continuation from the assessment in step S5 that the host vehicle can enter the circulatory roadway without stopping, the assessment in step S6 that the host vehicle entrance 105a is one lane, the assessment in step S8 that the entrance position is in the host vehicle lane, the assessment in step S9 that a lane change toward the entrance position is not possible, or the assessment in step S12 that lane-change control has ended, travel along the host vehicle lane is maintained and the process advances to step S14.

In step S14, in continuation from the maintenance of travel along the host vehicle lane in step S13, an assessment is made as to whether the host vehicle has arrived at the host vehicle entrance 105a, which is a border between the circulatory roadway 101 and the entry roadway 111. When the assessment is YES (arrived at entrance), the process advances to step S15. When the assessment is NO (not arrived at entrance), the process returns to step S13. The assessment that the host vehicle V has arrived at the host vehicle entrance 105a is made due to the distance from the host vehicle V to the host vehicle entrance 105a having been assessed to have come to be equal to or less than the prescribed distance, based on the host vehicle position information, the map data information, etc.

In step S15, in continuation from the assessment in step S14 that the host vehicle has arrived at the entrance, roundabout travel control is executed and the process advances to END. Roundabout travel control is control in which, under autonomous driving based on the host vehicle surroundings information and host vehicle position information acquired from the onboard sensor 1, the target route information, etc., the host vehicle enters the circulatory roadway 101 via the host vehicle entrance 105a, travels in the circulatory roadway 101, and then exits the circulatory roadway 101 via the host vehicle exit 106a and passes through the roundabout 100. This roundabout travel control is a well-known control and shall therefore not be described in detail.

Configuration of Process for First Entrance Position Setting Control

Figure 5:
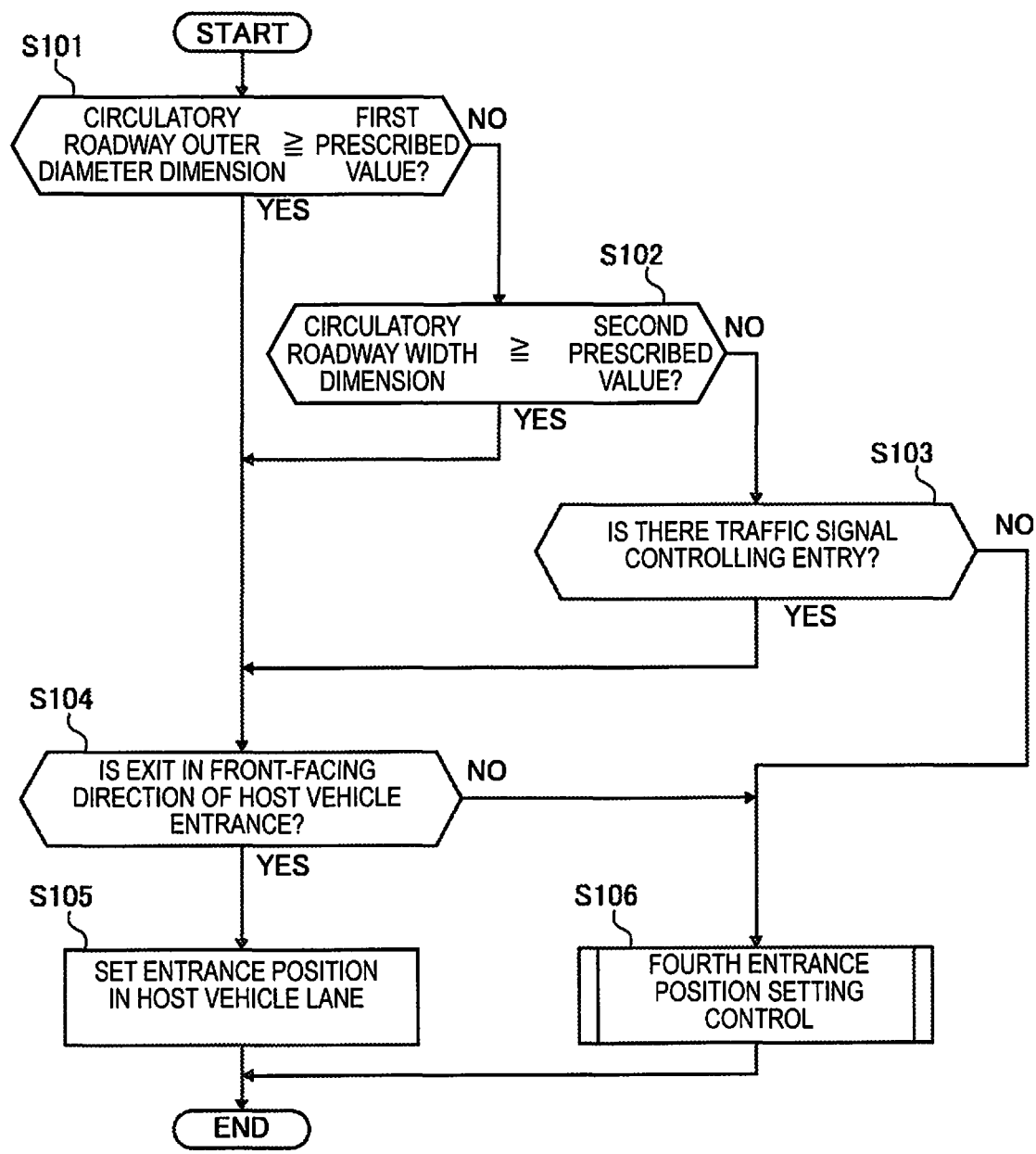
FIG. 5 is a flowchart of a flow of first entrance position setting control executed by the recognition assessment processor of the first embodiment.

FIG. 5 is a flowchart of a flow of first entrance position setting control. The steps of FIG. 5 are described below.

In step S101, an assessment is made as to whether the outer diameter dimension of the circulatory roadway 101 is equal to or greater than a first prescribed value in the roundabout 100 at which the host vehicle V has arrived. When the assessment is YES (circulatory roadway outer diameter dimension is equal to or greater than first prescribed value), the process advances to step S104. When the assessment is NO (circulatory roadway outer diameter dimension less than first prescribed value), the process advances to step S102. The "first prescribed value" is a value at which the travel distance needed to make a lane change in the circulatory roadway 101 can be ensured from the time the host vehicle V enters the circulatory roadway 101 until the host vehicle exits the circulatory roadway. The size of the outer diameter dimension of the circulatory roadway 101 is assessed using the roundabout information acquired in step S4 of driving assist control.

In step S102, in continuation from the assessment in S101 that the circulatory roadway outer diameter dimension is less than the first prescribed value, an assessment is made, based on the map data information, as to whether the width dimension of the circulatory roadway 101 is equal to or greater than a second prescribed value in the roundabout 100 at which the host vehicle V has arrived. When the assessment is YES (circulatory roadway width dimension equal to or greater than second prescribed value), the process advances to step S104. When the assessment is NO (circulatory roadway width dimension less than second prescribed value), the process advances to step S103. The "second prescribed value" is a value at which the host vehicle V is able to make a lane change in the circulatory roadway 101. The magnitude of the width dimension of the circulatory roadway 101 is assessed using the roundabout information acquired in step S4 of driving assist control.

In step S103, in continuation from the assessment in step S102 that the circulatory roadway outer diameter dimension is less than the second prescribed value, an assessment is made, based on the map data information, as to whether a traffic signal 108 controlling the entry of vehicles into the circulatory roadway 101 is provided in a position close to the host vehicle entrance 105a. When the assessment is YES (there is a traffic signal), the process advances to step S104. When the assessment is NO (there is no traffic signal), the process advances to step S106. The presence or absence of a traffic signal 108 is assessed using the roundabout information acquired in step S4 of driving assist control. Steps S101, S102, and S103 correspond to the roundabout state assessment part 35a.

In step S104, in continuation from either the assessment in step S101 that the circulatory roadway outer diameter dimension is equal to or greater than the first prescribed value, the assessment in step S102 that the circulatory roadway width dimension is equal to or greater than the second prescribed value, or the assessment in step S103 that there is a traffic signal, an assessment is made, based on the relative positional relationship between the host vehicle exit 106*a* and the host vehicle entrance 105*a*, as to whether the host vehicle exit 106*a* is present in the front-facing direction L3 of the host vehicle entrance 105*a*. When the assessment is YES (exit is in the front-facing direction), the process advances to step S105. When the assessment is NO (exit is not in the front-facing direction), the process advances to step S106. Step S104 corresponds to the relative position assessment part 35*e*. A state in which "the host vehicle exit 106*a* is present in the front-facing direction of the host vehicle entrance 105*a*" is a state in which the exit roadway 112 and the front-facing direction L3 of the host vehicle entrance 105*a* overlap. If the front-facing direction L3 of the host vehicle entrance 105*a* overlaps part of the exit roadway 112, the assessment "the host vehicle exit 106*a* is present in the front-facing direction of the host vehicle entrance 105*a*" is made. Conversely, a state in which "the turn signal 6 is not present in the front-facing direction of the host vehicle entrance 105*a*" is a state in which the exit roadway 112 is present in an area to the left or right of the front-facing direction L3 of the host vehicle entrance 105*a*, as seen in the advancing direction of the host vehicle V. Furthermore, the relative positional relationship between the host vehicle exit 106*a* and the host vehicle entrance 105*a* is assessed using the roundabout information acquired in step S4 of driving assist control.

In step S105, in continuation from the assessment in step S104 that "the host vehicle exit 106*a* is present in the front-facing direction of the host vehicle entrance 105*a*," the entrance position is set in the host vehicle lane and the process advances to END. Step S105 corresponds to the entrance position computation part 35*f*.

In step S106, in continuation from either the assessment in step S103 that there is no traffic signal or the assessment in step S104 that "the host vehicle exit 106*a* is not present in the front-facing direction of the host vehicle entrance 105*a*," execution of fourth entrance position setting control is selected and the process advances to END.

Configuration of Process for Second Entrance Position Setting Control

Figure 6:
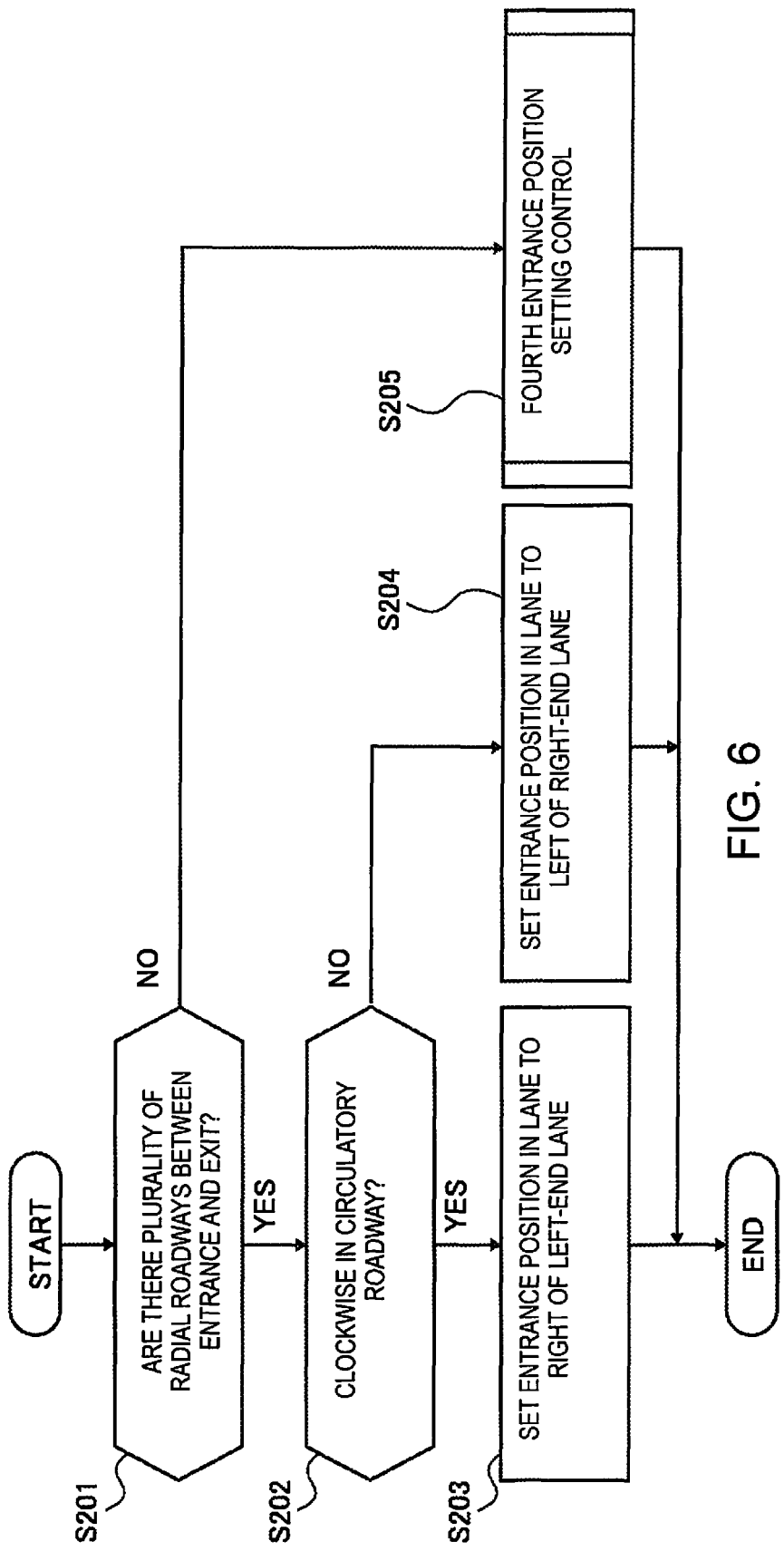
FIG. 6 is a flowchart of a flow of second entrance position setting control executed by the recognition assessment processor of the first embodiment.

FIG. 6 is a flowchart of a flow of second entrance position setting control. The steps of FIG. 6 are described below.

In step S201, assessment is made as to whether there are a plurality of radial roadways 110 connected to the circulatory roadway 101 between the host vehicle entrance 105*a* and the host vehicle exit 106*a* in the roundabout 100 at which the host vehicle V has arrived. When the assessment is YES (there are a plurality of radial roadways), the process advances to step S202. When the assessment is NO (there are not a plurality of radial roadways), the process advances to step S205. Step S201 corresponds to the radial roadway assessment part 35*b*. The presence or absence of a plurality of radial roadways 110 between the host vehicle entrance 105*a* and the host vehicle exit 106*a* is assessed using the roundabout information acquired in step S4 of driving assist control.

In step S202, in continuation from the assessment in step S201 that there are a plurality of radial roadways, an assessment is made as to whether the travel direction in the circulatory roadway 101 is clockwise. When the assessment is YES (the direction is clockwise), the process advances to step S203. When the assessment is NO (the direction is counterclockwise, the process advances to step S204.

In step S203, in continuation from the assessment in step S202 that the travel direction in the circulatory roadway 101 is clockwise, the entrance position is set in a lane to the right of a left-end lane and the process advances to END. A left-end lane is a lane located farthest to the left when facing in the advancing direction in the host vehicle entrance 105*a*. In this step S203, the entrance position is preferably set in a lane to the right of the left-end lane, and the entrance position is therefore set in a right lane when the host vehicle entrance 105*a* has two lanes. When, for example, the host vehicle entrance 105*a* has three lanes, the entrance position is set in either the center lane or the right-end lane.

In the description below, when there are a plurality of lanes in which the entrance position can be set, for example, a lane coinciding with the host vehicle lane is selected, a lane having a long drive distance to a preceding vehicle (there are few preceding vehicles aligned along the lane) is selected, or a lane adjacent to the host vehicle lane is selected.

In step S204, in continuation from the assessment in step S202 that the travel direction in the circulatory roadway 101 is counterclockwise, the entrance position is set in a lane to the left of a right-end lane and the process advances to END. A right-end lane is a lane located farthest to the right when facing in the advancing direction in the host vehicle entrance 105*a*. In this step S204, the entrance position is preferably set in a lane to the left of the right-end lane, and the entrance position is therefore set in a left lane when the host vehicle entrance 105*a* has two lanes. When, for example, the host vehicle entrance 105*a* has three lanes, the entrance position is set in either the center lane or the left-end lane. Steps S203 and S204 correspond to the entrance position computation part 35*f*.

In step S205, in continuation from the assessment in step S201 that there are not a plurality of radial roadways, execution of fourth entrance position setting control is selected and the process advances to END.

Configuration of Process for Third Entrance Position Setting Control

Figure 7:
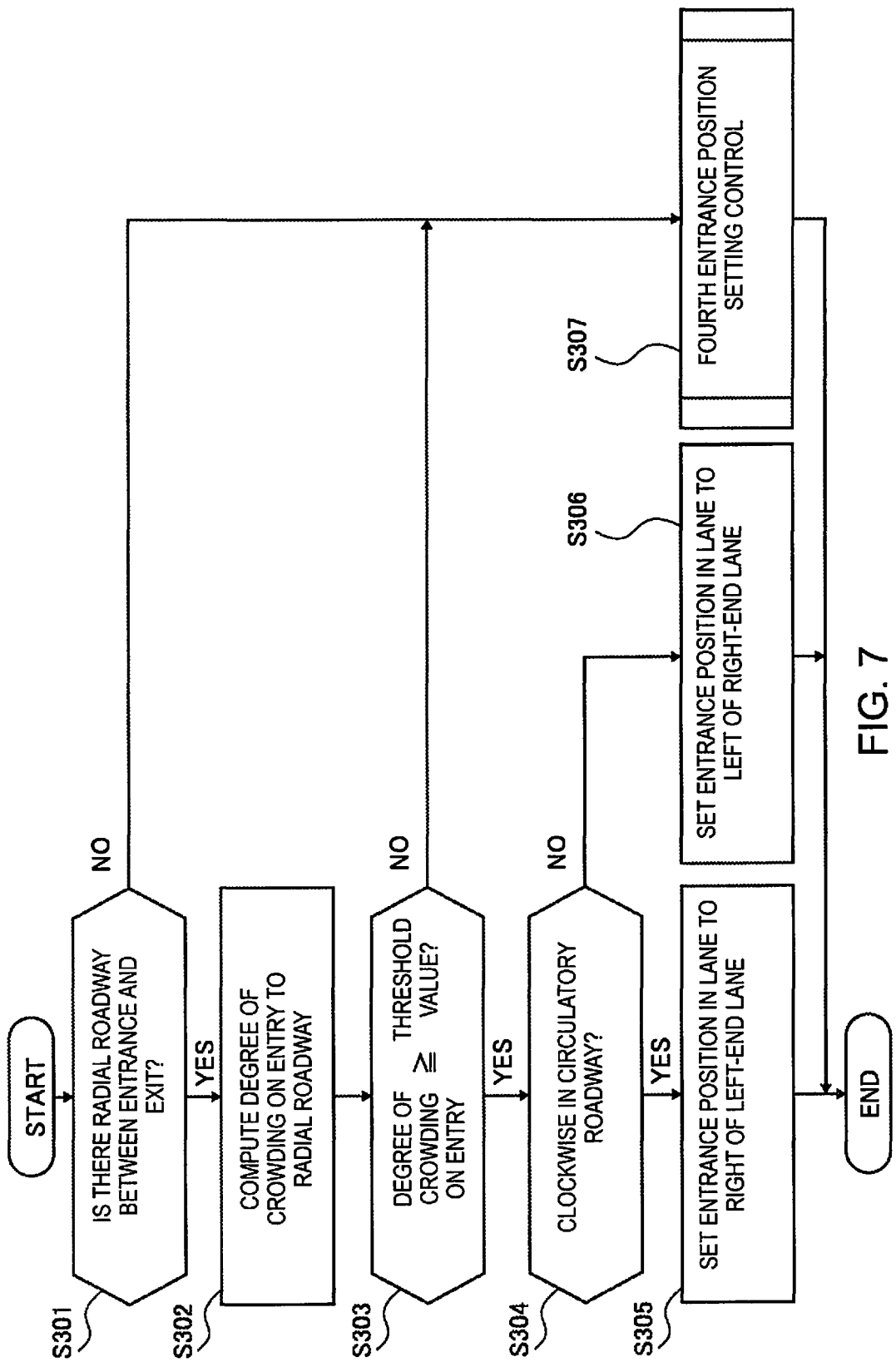
FIG. 7 is a flowchart of a flow of third entrance position setting control executed by the recognition assessment processor of the first embodiment.

FIG. 7 is a flowchart of a flow of third entrance position setting control. The steps of FIG. 7 are described below.

In step S301, an assessment is made, based on the map data information, as to whether there is a radial roadway 110 connected to the circulatory roadway 101 between the host vehicle entrance 105*a* and the host vehicle exit 106*a* in the roundabout 100 at which the host vehicle V has arrived. When the assessment is YES (there is a radial roadway), the process advances to step S302. When the assessment is NO (there is no radial roadway), the process advances to step S307. The presence or absence of a radial roadway 110 between the host vehicle entrance 105*a* and the host vehicle exit 106*a* is assessed using the roundabout information acquired in step S4 of driving assist control.

In step S302, in continuation from the assessment in step S301 that there is a radial roadway, a degree of crowding (degree of crowding on entry) is computed, this being the degree of crowding of other vehicles entering the circulatory roadway 101 from the radial roadway 110 between the host vehicle entrance 105*a* and the host vehicle exit 106*a*, and the process advances to step S303. The "degree of crowding on entry" is computed based on, for example, a number of vehicles entering per unit time, a number of vehicles on the radial roadway 110 per unit distance, etc. Information needed to compute the degree of crowding on entry is acquired via the onboard sensor 1 and/or the external data communicator 8.

In step S303, in continuation from the computation of the degree of crowding on entry in step S302, an assessment is made as to whether the degree of crowding on entry is equal to or greater than a threshold value, or Specifically, whether or not there is a high degree of crowding on entry to the radial roadway 110 between the host vehicle entrance 105*a* and the host vehicle exit 106a. When the assessment is YES (there is a high degree of crowding on entry), the process advances to step S304. When the assessment is NO (there is little crowding on entry), the process advances to step S307. Steps S301, S302, and S303 correspond to the degree of crowding assessment part 35c.

In step S304, in continuation from the assessment in step S303 that there is a high degree of crowding on entry, an assessment is made as to whether the travel direction in the circulatory roadway 101 is clockwise. When the assessment is YES (the direction is clockwise), the process advances to step S305. When the assessment is NO (the direction is counterclockwise), the process advances to step S306.

In step S305, in continuation from the assessment in step S304 that the travel direction in the circulatory roadway 101 is clockwise, the entrance position is set in a lane to the right of a left-end lane and the process advances to END. In this step S305, the entrance position is preferably set in a lane to the right of the left-end lane, and the entrance position is therefore set in a right lane when the host vehicle entrance 105a has two lanes. When, for example, the host vehicle entrance 105a has three lanes, the entrance position is set in either the center lane or the right-end lane.

In step S306, in continuation from the assessment in step S304 that the travel direction in the circulatory roadway 101 is counterclockwise, the entrance position is set in a lane to the left of a right-end lane and the process advances to END. In this step S306, the entrance position is preferably set in a lane to the left of the right-end lane, and the entrance position is therefore set in a left lane when the host vehicle entrance 105a has two lanes. When, for example, the host vehicle entrance 105a has three lanes, the entrance position is set in either the center lane or the left-end lane. Steps S305 and S306 correspond to the entrance position computation part 35f.

In step S307, in continuation from either the assessment that there are no radial roadways in step S301 or the assessment that there is little crowding on entry in step S303, execution of fourth entrance position setting control is selected and the process advances to END.

Configuration of Process for Fourth Entrance Position Setting Control

Figure 8:
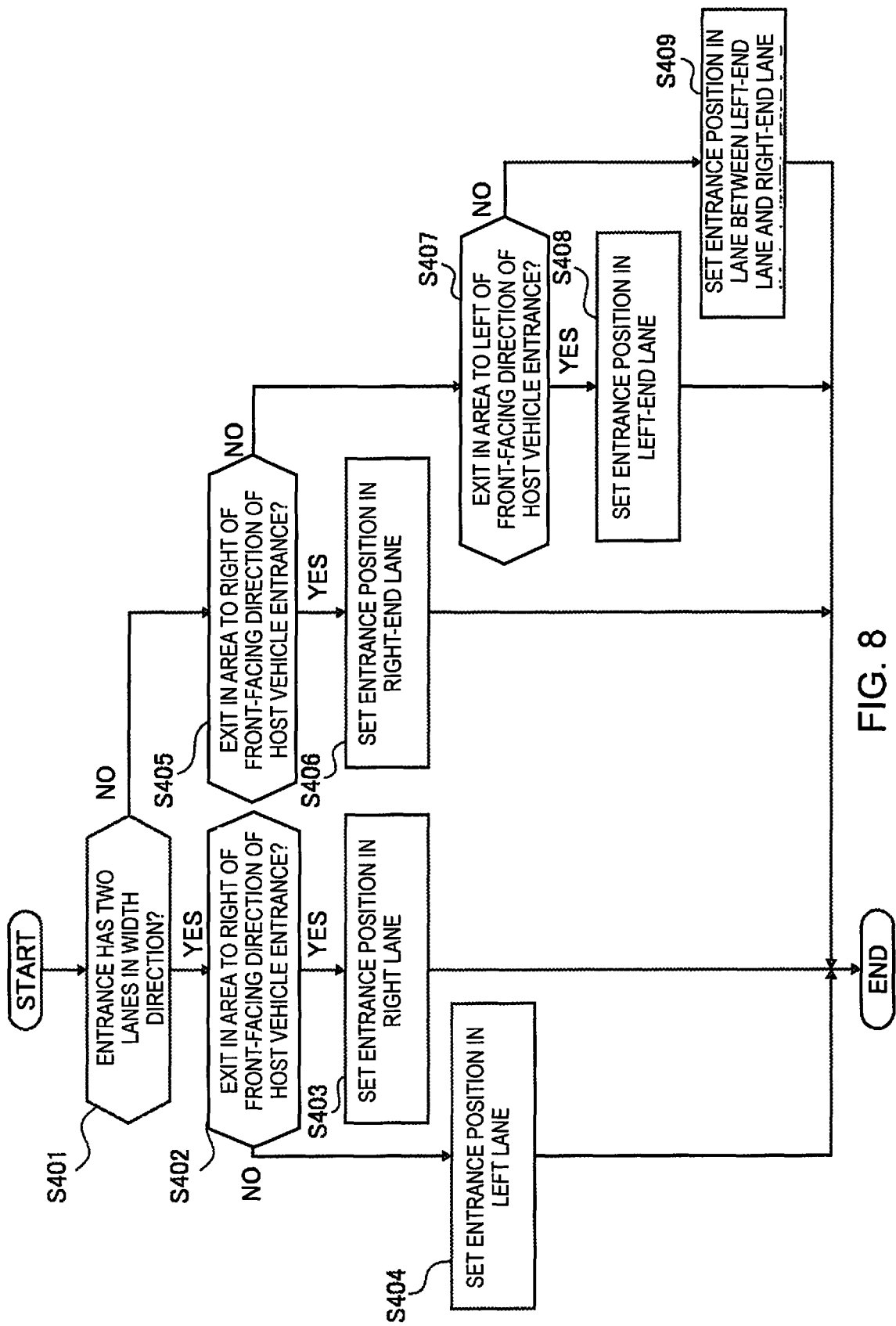
FIG. 8 is a flowchart of a flow of fourth entrance position setting control executed by the recognition assessment processor of the first embodiment.

FIG. 8 is a flowchart of a flow of fourth entrance position setting control. The steps of FIG. 8 are described below.

In step S401, an assessment is made as to whether the host vehicle entrance 105a has two lanes lined up in the width direction. When the assessment is YES (two lanes), the process advances to step S402. When the assessment is NO (three or more lanes), the process advances to step S405. Step S401 corresponds to the lane number assessment part 35d.

In step S402, in continuation from the assessment in step S401 that the host vehicle entrance 105a is two lanes, an assessment is made, based on the relative positional relationship between the host vehicle exit 106a and the host vehicle entrance 105a, as to whether the host vehicle exit 106a is present in an area to the right of the front-facing direction L3 of the host vehicle entrance 105a. When the assessment is YES (exit to right of front-facing direction), the process advances to step S403. When the assessment is NO (exit to left of front-facing direction or in front-facing direction), the process advances to step S404. The relative positional relationship between the host vehicle exit 106a and the host vehicle entrance 105a is assessed using the roundabout information acquired in step S4 of driving assist control.

In step S403, in continuation from the assessment in step S402 that "the host vehicle exit 106a is present to the right of the front-facing direction of the host vehicle entrance 105a," the entrance position is set in the right lane and the process advances to END.

In step S404, in continuation from the assessment in step S402 that "the host vehicle exit 106a is present to the left of the front-facing direction of the host vehicle entrance 105a or in the front-facing direction," the entrance position is set in the left lane and the process advances to END.

In step S405, in continuation from the assessment in step S401 that the host vehicle entrance 105a is three or more lanes, an assessment is made, based on the relative positional relationship between the host vehicle exit 106a and the host vehicle entrance 105a, as to whether the host vehicle exit 106a is present in an area to the right of the front-facing direction L3 of the host vehicle entrance 105a. When the assessment is YES (exit to right of front-facing direction), the process advances to step S406. When the assessment is NO (exit to left of front-facing direction or in front-facing direction), the process advances to step S407. The relative positional relationship between the host vehicle exit 106a and the host vehicle entrance 105a is assessed using the roundabout information acquired in step S4 of driving assist control.

In step S406, in continuation from the assessment in step S405 that "the host vehicle exit 106a is present to the right of the front-facing direction of the host vehicle entrance 105a," the entrance position is set in the right-end lane and the process advances to END.

In step S407, in continuation from the assessment in step S405 that "the host vehicle exit 106a is present to the left of the front-facing direction of the host vehicle entrance 105a or in the front-facing direction," an assessment is made as to whether the host vehicle exit 106a is present in an area to the left of the front-facing direction L3 of the host vehicle entrance 105a. When the assessment is YES (exit to left of front-facing direction), the process advances to step S408. When the assessment is NO (exit in front-facing direction), the process advances to step S409. Steps S402, S405, and S407 correspond to the relative position assessment part 35e. The relative positional relationship between the host vehicle exit 106a and the host vehicle entrance 105a is assessed using the roundabout information acquired in step S4 of driving assist control.

In step S408, in continuation from the assessment in step S407 that "the host vehicle exit 106a is present to the left of the front-facing direction of the host vehicle entrance 105a," the entrance position is set in the left-end lane and the process advances to END.

In step S409, in continuation from the assessment in step S407 that "the host vehicle exit 106a is present in the front-facing direction of the host vehicle entrance 105a," the entrance position is set in a lane between the left-end lane and the right-end lane and the process advances to END. Steps S403, S404, S406, S408, and S409 correspond to the entrance position computation part 35f.

Next, actions of the driving assist method and the driving assist device of the first embodiment shall be described for each travel scenario. The descriptions below presume as principles that traffic moves on the left side and the direction of travel in the circulatory roadway 101 is clockwise.

Scenario for Travel in which Entrance Position Need not be Set

While the host vehicle V is traveling, the recognition assessment processor 3 executes the driving assist control shown in FIG. 4. Specifically, the recognition assessment processor 3 performs the process from step S1 to steps S2 and S3 shown in FIG. 4, whereupon the target route, etc., is generated, and host vehicle position information and host vehicle surroundings information are acquired.

When the host vehicle V nears the roundabout 100 present in the travel roadway and the roundabout arrival assessment is affirmative in the process in step S3, the recognition assessment processor 3 performs the process from step S4 to step S5 and acquires information pertaining to the roundabout 100 at which the host vehicle V has been assessed to have arrived. Furthermore, an assessment is made as to whether the host vehicle V can enter the circulatory roadway 101 without stopping at the host vehicle entrance 105a.

In cases where no preceding vehicle is present in the host vehicle entrance 105a and no other vehicle heading toward the host vehicle entrance 105a is present in the circulatory roadway 101, it is deemed that it is possible to enter the circulatory roadway 101 without stopping at the host vehicle entrance 105a, and the process from step S13 to steps S14 and S15 is performed. Specifically, the recognition assessment processor 3 generates a target travel position at which the host vehicle V is to continue traveling in the lane (host vehicle lane) in which the host vehicle V is traveling at the current (e.g., the timing at which the host vehicle V has been assessed to have arrived at the roundabout 100) time point until arriving at the entrance position. The host vehicle V thereby continues to travel in the host vehicle lane until arriving at the entrance position. Upon arrival at the host vehicle entrance 105a, roundabout travel control is executed and the host vehicle V passes through the roundabout 100 under autonomous driving by means of universally-known control.

When, for example, a preceding vehicle is present in the host vehicle entrance 105a or another vehicle heading toward the host vehicle entrance 105a is present in the circulatory roadway 101, it is assessed in the process in step S5 that "it is impossible to enter the circulatory roadway 101 without stopping (it is necessary to stop at the host vehicle entrance 105a)." The process in step S6 is performed and whether or not the host vehicle entrance 105a is a plurality of lanes is assessed.

In this instance, when the host vehicle entrance 105a is one lane, the entrance position is inevitably set in the host vehicle lane. Therefore, execution of entrance position setting control is not necessary, the process advances from step S6 to step S13, S14, and S15, and travel in the host vehicle lane is continued, after which roundabout travel control is executed.

Scenario for Travel in which Entrance Position Must be Set

By contrast, in case where the host vehicle entrance 105a has a plurality of two or more lanes, the process in step S7 is performed and entrance position setting control is executed. Specifically, based on the positional relationship between the host vehicle entrance 105a and the host vehicle exit 106a, the recognition assessment processor 3 sets an "entrance position," which is the widthwise position of the host vehicle V in the host vehicle entrance 105a, and also sets a target lane in which this entrance position is set. In entrance position setting control, the first, second, and third entrance position setting controls shown in FIGS. 5 to 7 are executed in parallel. When the step of selecting fourth entrance position setting control execution has been reached in all of these processes, fourth entrance position setting control shown in FIG. 8 is executed.

As a result of entrance position setting control being executed, when the "entrance position" and the target lane are set, the process in step S8 is performed, and an assessment is made as to whether the set entrance position has been set in a lane other than the host vehicle lane, or Specifically, whether or not the target lane is another lane. When the target lane and the host vehicle lane coincide, a lane change is deemed unnecessary, the process advances from step S8 to steps S13, S14, and S15, and travel in the host vehicle lane is continued, after which roundabout travel control is executed.

When the target lane and the host vehicle lane do not coincide, a lane change toward the entrance position is deemed necessary, the process in step S9 is performed, and an assessment is made as to whether a lane change toward the entrance position can be executed. Based on the presence of an adjacent vehicle, the distance to the host vehicle entrance 105a, and other aspects of the environment of the host vehicle surroundings, when a lane change has been assessed to be not possible, a lane change is deemed impossible, the process advances from step S9 to steps S13, S14, and S15, and travel in the host vehicle lane is continued, after which roundabout travel control is executed.

Conversely, in the process in step S9, when a lane change has been assessed to be possible, the processes of steps S10 and S11 are performed in order, execution of lane-change control is allowed, and lane-change control is executed. When lane-change control has been assessed by the process in step S12 to have ended, the process advances to steps S13, S14, and S15 and travel in the host vehicle lane is continued, after which roundabout travel control is executed. When a lane change has been assessed to not be possible while lane-change control is being executed, the execution of lane-change control is suspended and the process in steps S13, S14, and S15 is performed.

A target lane setting action in the driving assist method and the driving assist device shall next be described in each of the travel scenarios.

Scenario in which Circulatory Roadway Outer Diameter Dimension is First Prescribed Value or Greater and there is Host Vehicle Exit in Front-Facing Direction of Host Vehicle Entrance A case is considered in which, when entrance position setting control is executed in the recognition assessment processor 3, the outer diameter dimension of the circulatory roadway 101 (referred to below as the "circulatory roadway outer diameter dimension R1") is equal to or greater than a first prescribed value in a roundabout 100A shown in FIG. 9. In this case, the circulatory roadway outer diameter dimension is assessed to be equal to or greater than a first threshold value in the process in step S101 of first entrance position setting control shown in FIG. 5, and the process in step S104 is performed. In the travel scenario shown in FIG. 9, the exit roadway 112 overlaps the front-facing direction L3 of the host vehicle entrance 105a and the assessment "host vehicle exit 106a is present in front-facing direction of host vehicle entrance 105a" is made. Therefore, the process in step S105 is performed and the entrance position is set in the host vehicle lane. Specifically, in the example shown in FIG. 9, in which the entry roadway 111 is two lanes, the entrance position is set in a right lane 111R when the host vehicle V is traveling in the right lane 111R. The entrance position is set in a left lane 111L when the host vehicle V is traveling in the left lane 111L.

Due to these actions, there is no need for a lane change during travel in the entry roadway 111, and the incidence of lane changing within the entry roadway 111 can be minimized.

When the circulatory roadway outer diameter dimension R1 is equal to or greater than the first prescribed value, a lane change is possible from the time the host vehicle V enters the circulatory roadway 101 until the host vehicle exits the circulatory roadway. Specifically, a lane change can be made as appropriate in accordance with the situation in the circulatory roadway 101, regardless of the entrance position. Conversely, when the host vehicle exit 106a is in the area to the left of the front-facing direction L3 of the host vehicle entrance 105a, the time in which the host vehicle V remains in the circulatory roadway comparatively decreases. Therefore, it is preferable that the host vehicle travels closer to the outer periphery within the circulatory roadway 101. When the host vehicle exit 106a is in the area to the right of the front-facing direction L3 of the host vehicle entrance 105a, the time in which the host vehicle V remains in the circulatory roadway comparatively increases. Therefore, it is preferable that the host vehicle travels close to the inner periphery within the circulatory roadway 101 so as to not obstruct travel of other vehicles (particularly operations of other vehicles exiting the circulatory roadway 101). When the host vehicle exit 106a is present in the front-facing direction L3 of the host vehicle entrance 105a, the degree of freedom in selecting the travel route in the circulatory roadway 101 is higher than when the host vehicle exit 106a is offset to either the left or right from the front-facing direction L3 of the host vehicle entrance 105a.

Therefore, when the circulatory roadway outer diameter dimension R1 is equal to or greater than the first prescribed value and the host vehicle exit 106a is present in the front-facing direction L3 of the host vehicle entrance 105a, the entrance position may be set in any lane. Specifically, in the example shown in FIG. 5, the entrance position was set in the host vehicle lane in the process in step S105, but this example is not provided by way of limitation. For example, the entrance position may be set in a lane where there are few preceding vehicles. In this case, the circulatory roadway 101 can be entered in a short time or the roundabout 100 can be passed through quickly.

Scenario in which Circulatory Roadway Outer Diameter Dimension is Second Prescribed Value or Greater and there is Host Vehicle Exit in Front-Facing Direction of Host Vehicle Entrance A case is considered in which the circulatory roadway outer diameter dimension R1 is less than the first prescribed value and the width dimension of the circulatory roadway 101 (referred to below as the "circulatory roadway width dimension W1") is equal to or greater than a second prescribed value in the roundabout 100A shown in FIG. 9. In this case, in the process in step S102 of first entrance position setting control shown in FIG. 5, the circulatory roadway width dimension is assessed to be equal to or greater than a second threshold value and the process in step S104 is performed. In the travel scenario shown in FIG. 9, the assessment "host vehicle exit 106a is present in front-facing direction of the host vehicle entrance 105a" is made, the process in step S105 is performed, and the entrance position is set in the host vehicle lane. Specifically, in the example shown in FIG. 9, in which the entry roadway 111 is two lanes, the entrance position is set in the right lane 111R when the host vehicle V is traveling in the right lane 111R. The entrance position is set in the left lane 111L when the host vehicle V is traveling in the left lane 111L.

Due to these actions, there is no need for a lane change during travel in the entry roadway 111, and the incidence of lane changing within the entry roadway 111 can be minimized.

Even when the circulatory roadway width dimension W1 is equal to or greater than the second prescribed value, a lane change can be made from the time the host vehicle V enters the circulatory roadway 101 until the host vehicle exits the circulatory roadway. Specifically, a lane change can be made as appropriate in accordance with the situation in the circulatory roadway 101, regardless of the entrance position. Therefore, the entrance position may be set to any lane when the circulatory roadway width dimension W1 is equal to or greater than the second prescribed value and the host vehicle exit 106a is present in the front-facing direction L3 of the host vehicle entrance 105a. Due to this configuration, the circulatory roadway 101 can be entered in a short time and the roundabout 100 can be passed through quickly in accordance with the situation in the host vehicle surroundings or the traveling situation of the host vehicle V.

Figure 9:
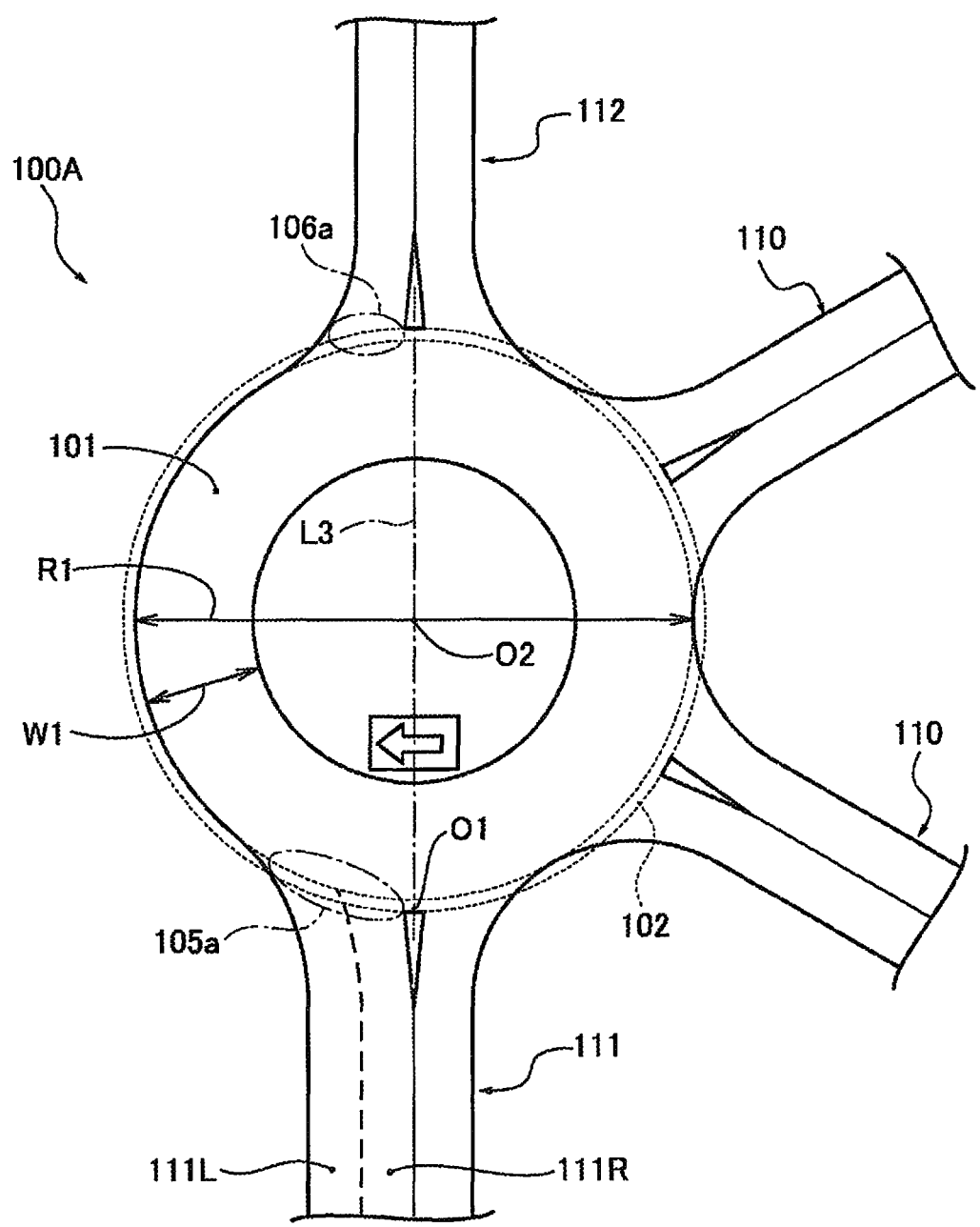
FIG. 9 is a schematic diagram of an entrance position setting action in a scenario in which a host vehicle entrance is two lanes and a host vehicle is to advance straight through a roundabout.

Scenario in which there is Traffic Signal Controlling Entry to the Circulatory Roadway and there is Host Vehicle Exit in Front-Facing Direction of Host Vehicle Entrance A case is considered in which, in the roundabout 100A shown in FIG. 9, the circulatory roadway outer diameter dimension R1 is less than the first prescribed value, the circulatory roadway width dimension W1 is less than the second prescribed value, and a traffic signal 108 (see FIG. 2) controlling entry to the circulatory roadway 101 is installed in a location close to the host vehicle entrance 105a (the traffic signal 108 is not shown in FIG. 9). In this case, there is assessed to be a traffic signal in the process in step S103 of first entrance position setting control shown in FIG. 5, and the process in step S104 is performed. In the travel scenario shown in FIG. 9, the assessment "host vehicle exit 106a is present in front-facing direction of the host vehicle entrance 105a" is made, the process in step S105 is performed, and the entrance position is set in the host vehicle lane. Specifically, in the example shown in FIG. 9, in which the entry roadway 111 is two lanes, the entrance position is set in the right lane 111R when the host vehicle V is traveling in the right lane 111R. When the host vehicle V is traveling in the left lane 111L, the entrance position is set in the left lane 111L.

Due to these actions, there is no need for a lane change during travel in the entry roadway 111, and the incidence of lane changing within the entry roadway 111 can be minimized.

When a traffic signal 108 controlling entry to the circulatory roadway 101 is installed, there is a limit on the number of vehicles in the circulatory roadway 101 and the circulatory roadway 101 does not readily become crowded. Specifically, a lane change can easily be made in accordance with the situation in the circulatory roadway 101, regardless of the entrance position. Therefore, when a traffic signal 108 controlling entry to the circulatory roadway 101 is installed, the entrance position may be set in any lane even when the host vehicle exit 106a is present in the front-facing direction L3 of the host vehicle entrance 105a. Due to this configuration, the circulatory roadway 101 can be entered in a short time and the roundabout 100 can be passed through quickly in accordance with the situation in the host vehicle surroundings or the traveling situation of the host vehicle V.

In first entrance position setting control shown in FIG. 5, when the circulatory roadway outer diameter dimension R1 is less than the first prescribed value, the circulatory roadway width dimension W1 is less than the second prescribed value, and an entry-controlling traffic signal is not installed, the process advances to step S106 and execution of fourth entrance position setting control is selected.

Figure 10:
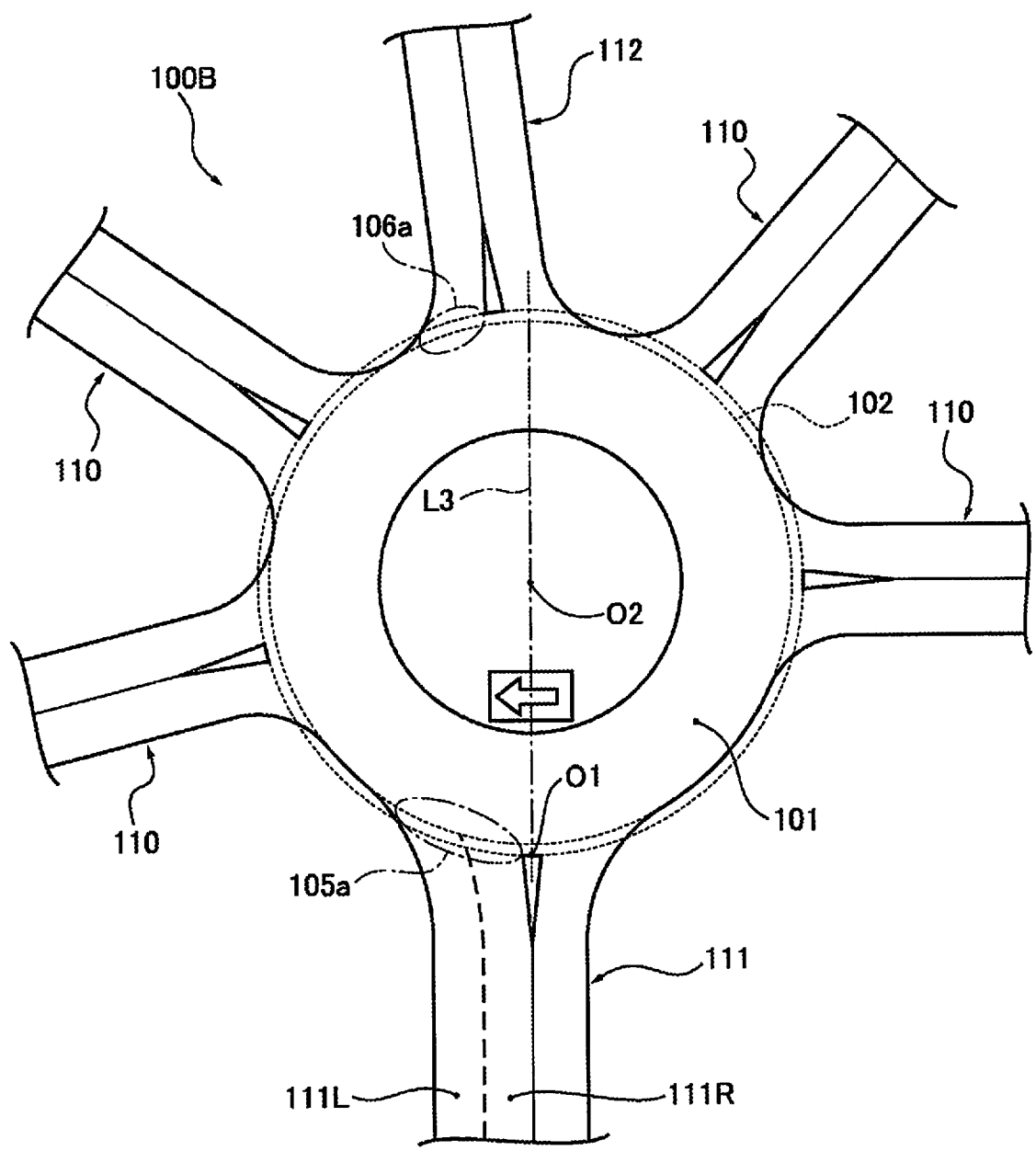
FIG. 10 is a schematic diagram of an entrance position setting action in a scenario in which there are a plurality of radial roadways between a host vehicle entrance and a host vehicle exit.
Figure 14:
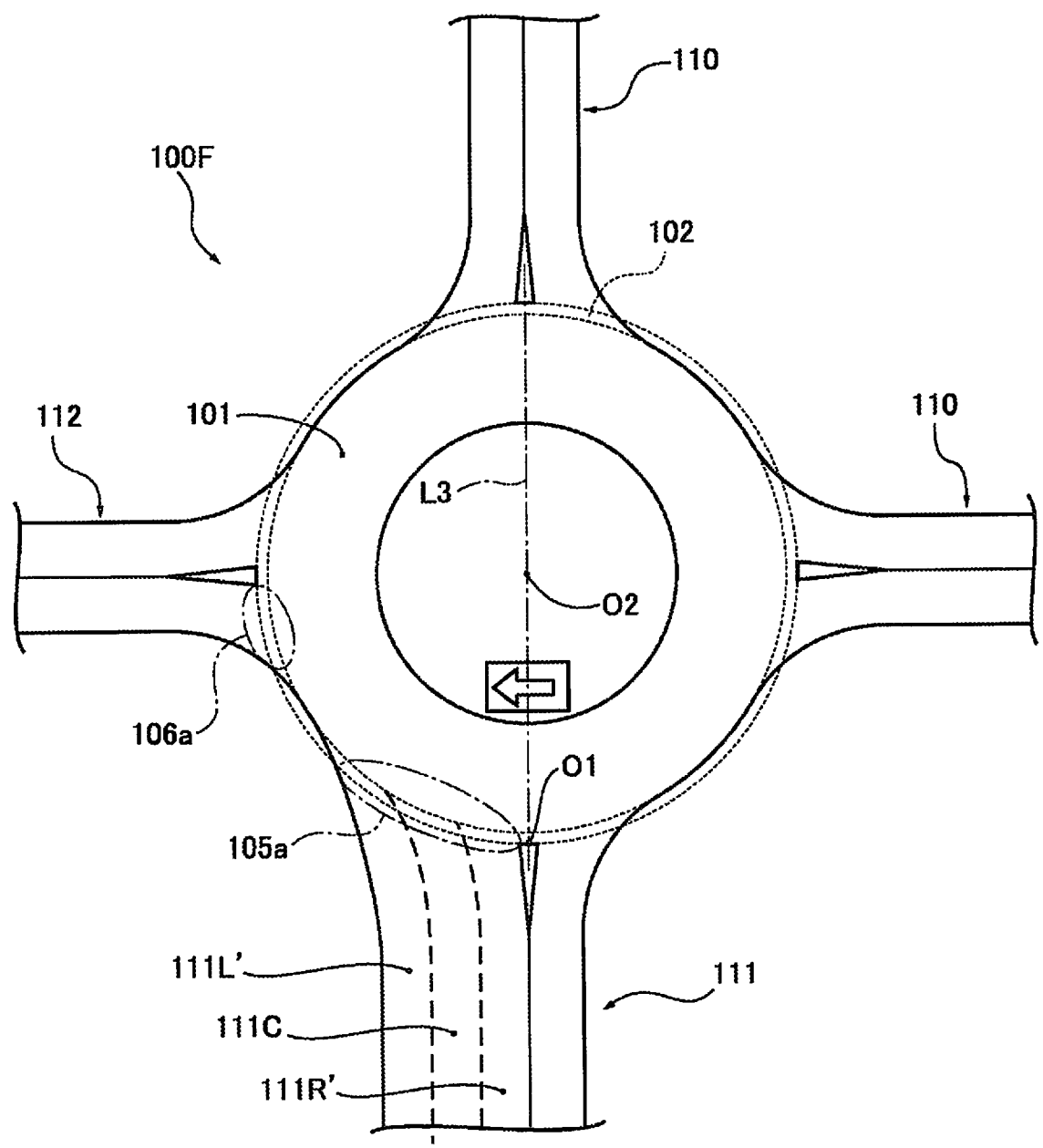
FIG. 14 is a schematic diagram of an entrance position setting action in a scenario in which a host vehicle entrance is three lanes and a host vehicle is to turn left through a roundabout.

Scenario in which there are Plurality of Radial Roadways Between Host Vehicle Entrance and Host Vehicle Exit A case is considered in which, in a roundabout 100B shown in FIG. 10, there are a plurality of radial roadways 110 connected to the circulatory roadway 101 between the host vehicle entrance 105a and the host vehicle exit 106a. In this case, there are assessed to be a plurality of radial roadways in the process in step S201 of second entrance position setting control shown in FIG. 6, and the process in step S202 is performed. In the roundabout 100B shown in FIG. 10, [vehicles] advance clockwise through the circulatory roadway 101; therefore, the process in step S203 is performed and the entrance position is set in a lane to the right of the left-end lane. Specifically, in the example shown in FIG. 10, in which the entry roadway 111 is two lanes, the entrance position is set in the right lane 111R. In a case in which the entry roadway 111 is three lanes, such as is shown in FIG. 14, the entrance position is set in either a right-end lane 111R' or a center lane 111C. In this case, the entrance position is set based on other conditions (for example, there being few preceding vehicles, etc.).

In a case in which the travel direction in the circulatory roadway 101 is counterclockwise, the process from step S202 to step S204 is performed and the entrance position is set in a lane to the left of the right-end lane. Specifically, in an example in which the entry roadway 111 is two lanes, such as is shown in FIG. 10, the entrance position is set in the left lane 111L. In a case in which the entry roadway 111 is three lanes, such as is shown in FIG. 14, the entrance position is set in either a left-end lane 111L' or the center lane 111C. In this case, the entrance position is set based on other conditions (for example, there being few preceding vehicles, etc.).

Due to this configuration, travel is not readily obstructed for other vehicles entering from the plurality of radial roadways 110 between the host vehicle entrance 105a and the host vehicle exit 106a or for other vehicles exiting the radial roadways 110, and it is possible to travel smoothly through the circulatory roadway 101.

In second entrance position setting control shown in FIG. 6, when a plurality of radial roadways 110 are not present between the host vehicle entrance 105a and the host vehicle exit 106a (when the exit roadway 112 is adjacent to the entry roadway 111 or when only one radial roadway 110 is present between the entry roadway 111 and the exit roadway 112), the process advances to step S205 and execution of fourth entrance position setting control is selected.

Figure 11:
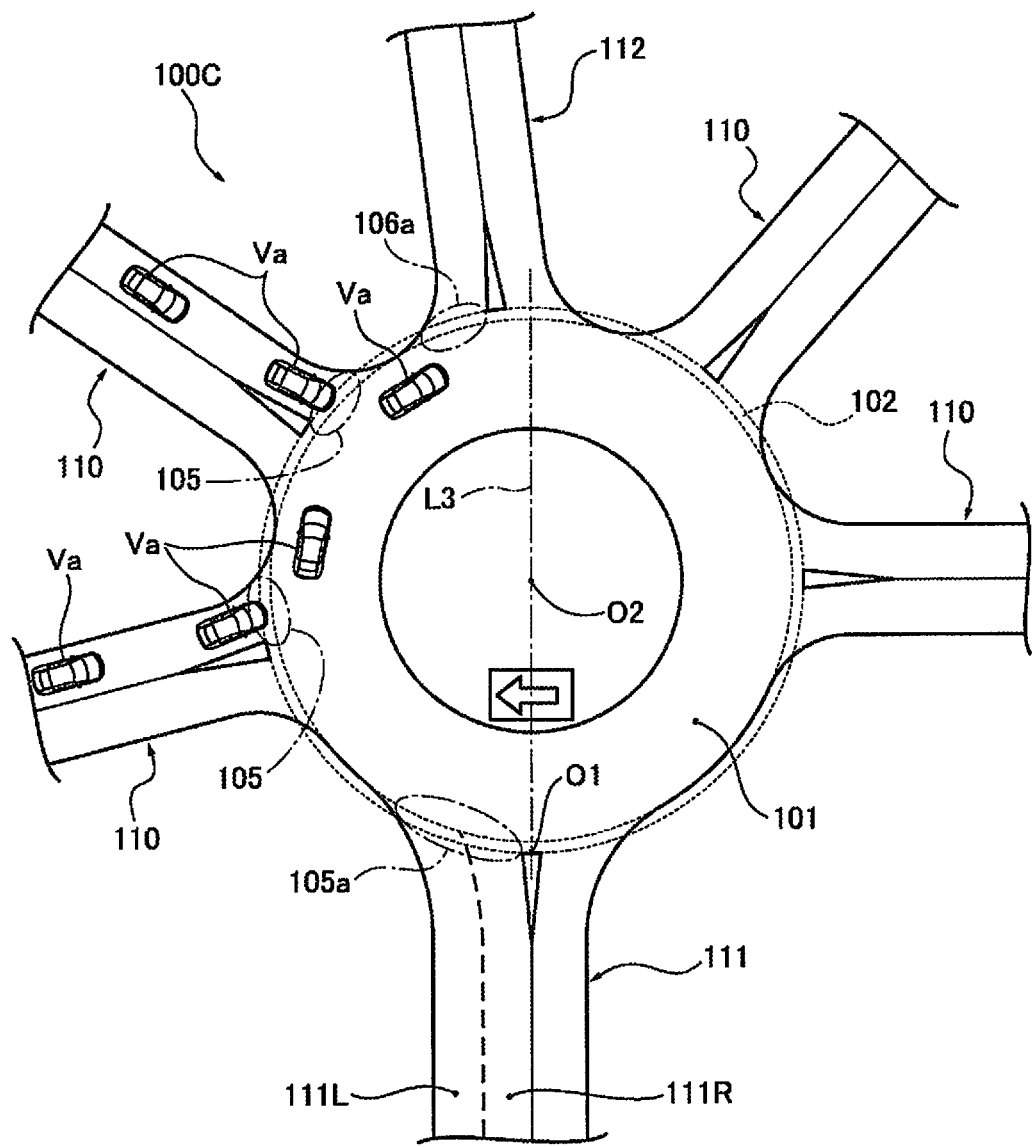
FIG. 11 is a schematic diagram of an entrance position setting action in a scenario involving a high degree of crowding on entry to a radial roadway between a host vehicle entrance and a host vehicle exit.

Scenario in which there is a High Degree of Crowding on Entry in Radial Roadways Between Host Vehicle Entrance and Host Vehicle Exit A case is considered in which, in a roundabout 100C shown in FIG. 11, radial roadways 110 connected to the circulatory roadway 101 are present between the host vehicle entrance 105a and the host vehicle exit 106a and there is a high degree of crowding on entry among other vehicles Vα in the radial roadways 110. In this case, there are assessed to be radial roadways in the process in step S301 of third entrance position setting control shown in FIG. 7, the process in step S302 is performed, and the degrees of crowding on entry in the radial roadways 110 between the host vehicle entrance 105a and the host vehicle exit 106a are computed. If the degrees of crowding on entry are equal to or greater than a threshold value, the assessment of step S303 is affirmative and the process in step S304 is performed. In the roundabout 100C shown in FIG. 11, [vehicles] advance through the circulatory roadway 101 in a clockwise direction; therefore, the process in step S305 is performed and the entrance position is set in a lane to the right of the left-end lane. Specifically, in the example shown in FIG. 11, in which the entry roadway 111 is to lanes, the entrance position is set in the right lane 111R. When the entry roadway 111 is three lanes (see FIG. 14), the entrance position is set in either the right-end lane 111R' or the center lane 111C. In this case, the entrance position is set based on other conditions (for example, there being few preceding vehicles, etc.).

In a case in which the travel direction in the circulatory roadway 101 is counterclockwise, the process from step S304 to step S306 is performed and the entrance position is set in a lane to the left of the right-end lane. Specifically, in an example in which the entry roadway 111 is two lanes, such as is shown in FIG. 11, the entrance position is set in the left lane 111L. In a case in which the entry roadway 111 is three lanes, such as is shown in FIG. 14, the entrance position is set in either the left-end lane 111L' or the center lane 111C. In this case, the entrance position is set based on other conditions (for example, there being few preceding vehicles, etc.).

Due to this configuration, travel is not readily obstructed for other vehicles entering from the radial roadways 110 between the host vehicle entrance 105a and the host vehicle exit 106a, and it is possible to travel smoothly through the circulatory roadway 101. By not obstructing the travel of other vehicles, [this method] can contribute to smooth traffic without hindering traffic flow in the roundabout 100. Moreover, it is possible to travel through the circulatory roadway 101 in a lane having a low degree of crowding and to quickly pass through the roundabout 100.

In third entrance position setting control shown in FIG. 7, when radial roadways 110 are present between the host vehicle entrance 105a and the host vehicle exit 106a or when the degree of crowding on entry is low, the process advances to step S307 and execution of fourth entrance position setting control is selected.

Figure 12:
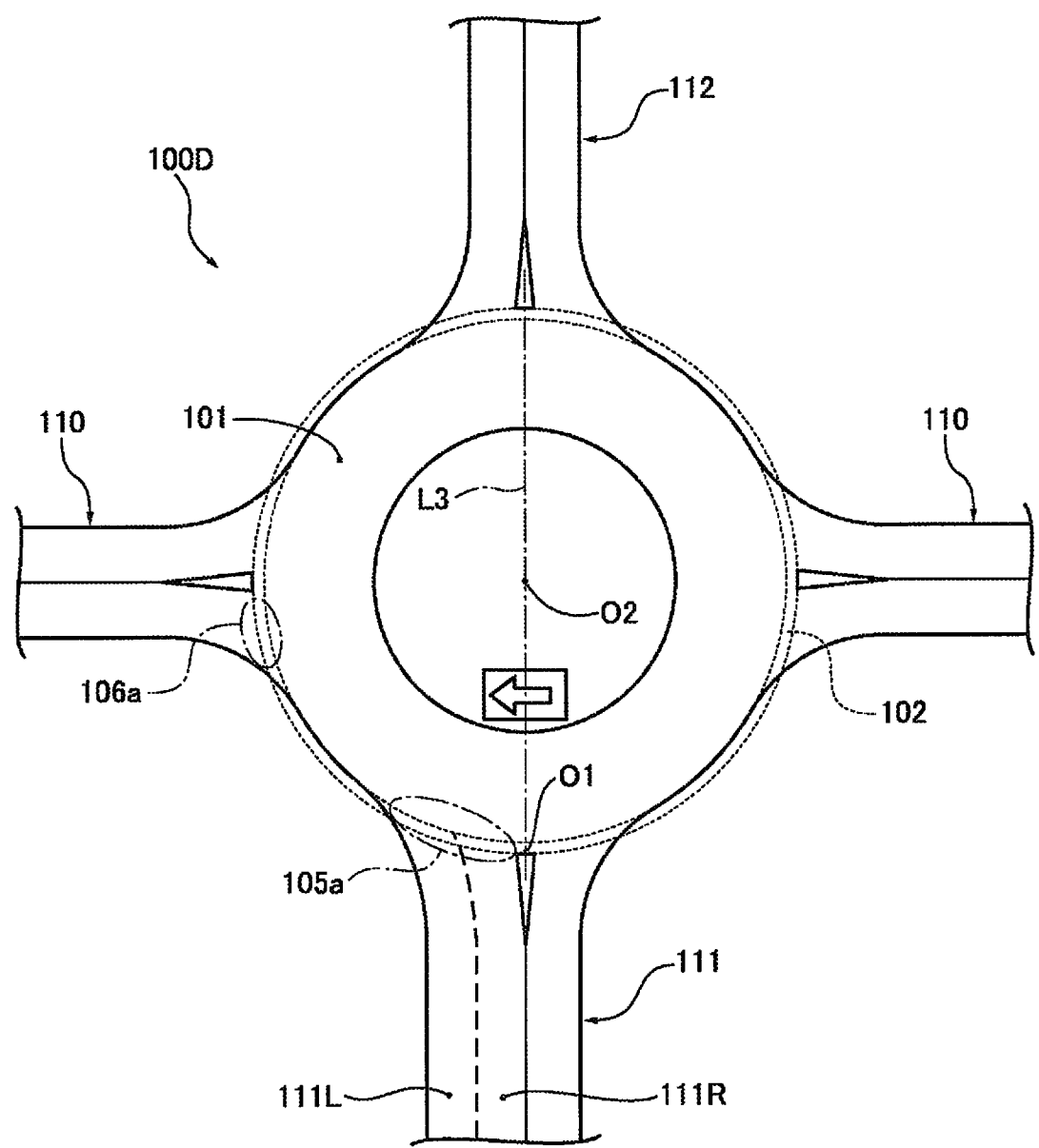
FIG. 12 is a schematic diagram of an entrance position setting action in a scenario in which a host vehicle entrance is two lanes and a host vehicle is to turn left through a roundabout.

Scenario in which Host Vehicle Entrance is Two Lanes and Left Turn is to be Made at Roundabout It is presumed in the descriptions below that execution of fourth entrance position setting control has been selected in all of the first through third entrance position setting controls. A scenario of turning left is considered in a roundabout 100D shown in FIG. 12, in which the entry roadway 111 is two lanes. In this case, the assessment is affirmative in the process in step S401 of fourth entrance position setting control shown in FIG. 8, and the process in step S402 is performed. Specifically, an assessment is made as to whether the host vehicle exit 106a is present in the area to the right of the front-facing direction L3 of the host vehicle entrance 105a. In the travel scenario shown in FIG. 12, the assessment "host vehicle exit 106a is present in area to left of front-facing direction L3 of host vehicle entrance 105a" is made, the aforementioned assessment is negative, the process in step S404 is performed, and the entrance position is set in the left lane 111L.

Due to this configuration, the host vehicle will not unnecessarily move inward within the circulatory roadway 101, and the host vehicle can travel near the outer periphery within the circulatory roadway 101 and exit smoothly. Therefore, the incidence of lane changing in the circulatory roadway 101 can be minimized.

Scenario in which Entrance Position is Two Lanes and Straight Advance is to be Made at Roundabout A scenario is considered in which the host vehicle advances straight in the roundabout 100A shown in FIG. 9, in which the entry roadway 111 is two lanes. In this case, an affirmative assessment is made in the process in step S401 of fourth entrance position setting control shown in FIG. 8, and the process in step S402 is performed. In the travel scenario shown in FIG. 9, the assessment "host vehicle exit 106a is present in front-facing direction L3 of host vehicle entrance 105a" is made, the aforementioned assessment is negative, the process in step S404 is performed, and the entrance position is set in the left lane 111L.

Due to this configuration, the host vehicle will not unnecessarily move inward within the circulatory roadway 101, and the host vehicle can travel near the outer periphery within the circulatory roadway 101 and exit smoothly. Therefore, the incidence of lane changing in the circulatory roadway 101 can be minimized.

Figure 13:
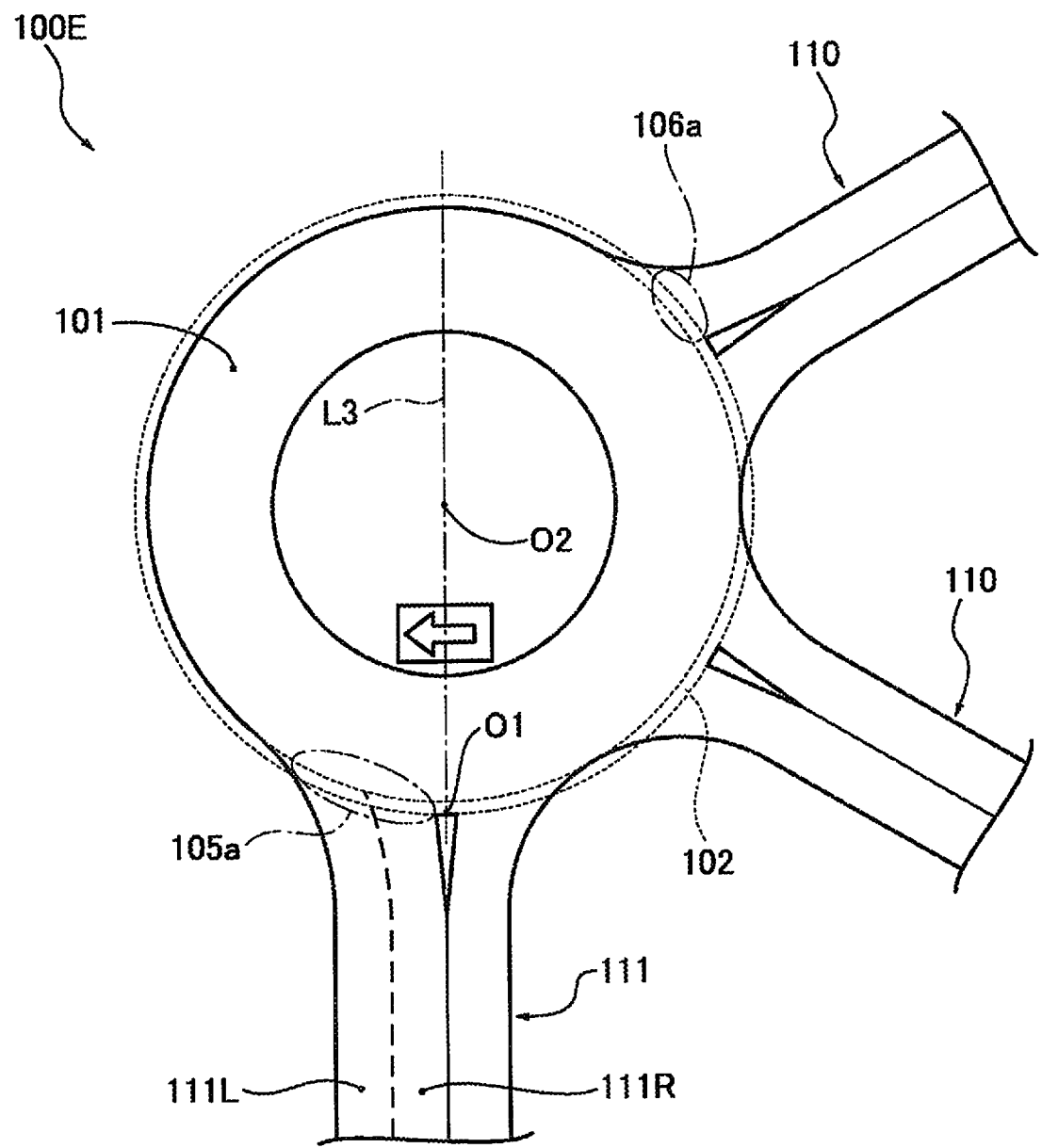
FIG. 13 is a schematic diagram of an entrance position setting action in a scenario in which a host vehicle entrance is two lanes and a host vehicle is to turn right through a roundabout.

Scenario in which Host Vehicle Entrance is Two Lanes and Right Turn is to be Made at Roundabout A scenario of turning right is considered in a roundabout 100E shown in FIG. 13, in which the entry roadway 111 is two lanes. In this case, the assessment is affirmative in the process in step S401 of fourth entrance position setting control shown in FIG. 8, and the process in step S402 is performed. In the travel scenario shown in FIG. 13, the assessment "host vehicle exit 106a is present in area to right of front-facing direction L3 of host vehicle entrance 105a" is made, the aforementioned assessment is affirmative, the process in step S403 is performed, and the entrance position is set in the right lane 111R.

Due to this configuration, travel distance within the circulatory roadway 101 can be shortened further and the circulatory roadway 101 can be exited more quickly than in a case of traveling near the outer periphery within the circulatory roadway 101.

Scenario in which Host Vehicle Entrance is Three Lanes and Left Turn is to be Made at Roundabout A scenario of turning left is considered in a roundabout 100F shown in FIG. 14, in which the entry roadway 111 is three lanes. In this case, a negative assessment is made in the process in step S401 of fourth entrance position setting control shown in FIG. 8, and the process in step S405 is performed. Specifically, an assessment is made as to whether the host vehicle exit 106a is present in the area to the right of the front-facing direction L3 of the host vehicle entrance 105a. In the travel scenario shown in FIG. 14, the assessment "host vehicle exit 106a is present in area to left of front-facing direction L3 of host vehicle entrance 105a" is made, the aforementioned assessment is negative, and the process in step S407 is performed. Specifically, an assessment is made as to whether the host vehicle exit 106a is present in the area to the left of the front-facing direction L3 of the host vehicle entrance 105a. In the travel scenario shown in FIG. 14, the assessment is affirmative, the process in step S408 is performed, and the entrance position is set in the left-end lane 111L'.

Due to this configuration, the host vehicle will not unnecessarily move inward within the circulatory roadway 101, and the host vehicle can travel near the outer periphery within the circulatory roadway 101 and exit smoothly. Therefore, the incidence of lane changing in the circulatory roadway 101 can be minimized.

Figure 15:
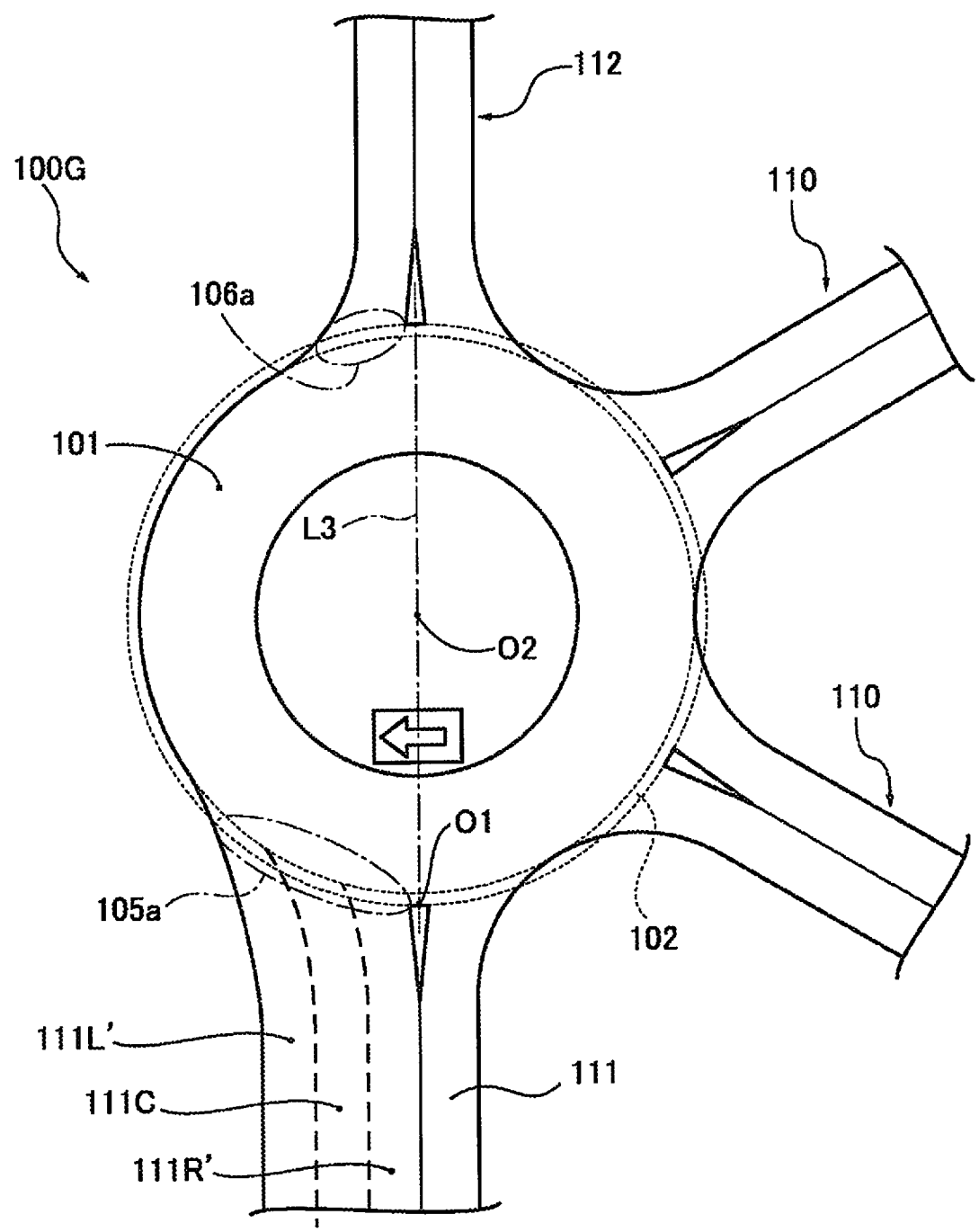
FIG. 15 is a schematic diagram of an entrance position setting action in a scenario in which a host vehicle entrance is three lanes and a host vehicle is to advance straight through a roundabout.

Scenario in which Host Vehicle Entrance is Three Lanes and Straight Advance is to be Made at Roundabout A scenario of advancing straight is considered in a roundabout 100G shown in FIG. 15, in which the entry roadway 111 is three lanes. In this case, a negative assessment is made in the process in step S401 of fourth entrance position setting control shown in FIG. 8, and the process in step S405 is performed. In the travel scenario shown in FIG. 15, the assessment "host vehicle exit 106a is present in front-facing direction L3 of host vehicle entrance 105a" is made, the aforementioned assessment is negative, and the process in step S407 is performed. In the travel scenario shown in FIG. 15, the assessment is negative in the process in step S407 as well. As a result, the process in step S409 is performed and the entrance position is set in the center lane 111C.

Due to this configuration, travel distance within the circulatory roadway 101 can be shortened further and the circulatory roadway 101 can be exited more quickly than in a case of traveling near the outer periphery within the circulatory roadway 101.

Figure 16:
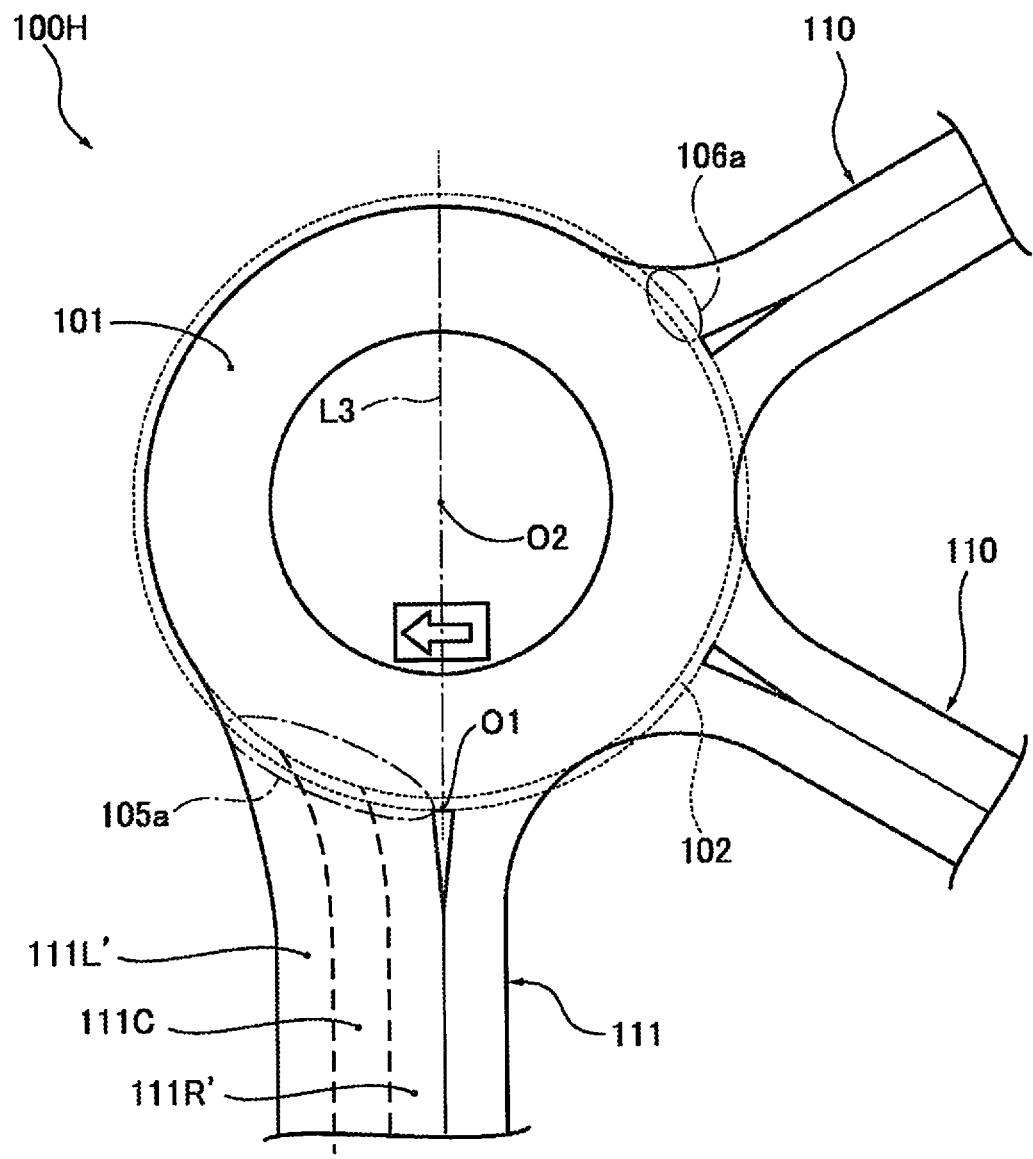
FIG. 16 is a schematic diagram of an entrance position setting action in a scenario in which a host vehicle entrance is three lanes and a host vehicle is to turn right through a roundabout.

Scenario in which Host Vehicle Entrance is Three Lanes and Right Turn is to be Made at Roundabout A scenario of turning right is considered in a roundabout 100H shown in FIG. 16, in which the entry roadway 111 is three lanes. In this case, a negative assessment is made in the process in step S401 of fourth entrance position setting control shown in FIG. 8, and the process in step S405 is performed. In the travel scenario shown in FIG. 15, the assessment "host vehicle exit 106a is present in area to right of front-facing direction L3 of host vehicle entrance 105a" is made, the aforementioned assessment is affirmative, the process in step S406 is performed, and the entrance position is set in the right-end lane 111R'.

Due to this configuration, travel distance within the circulatory roadway 101 can be shortened further and the circulatory roadway 101 can be exited more quickly than in a case of traveling near the outer periphery within the circulatory roadway 101.

Thus, with the driving assist method and driving assist device of the first embodiment, the positions of the host vehicle entrance 105a and the host vehicle exit 106a can be specified when an assessment has been made that the host vehicle V has arrived at the roundabout 100. The entrance position is then set based on the positional relationship between the host vehicle entrance 105a and the host vehicle exit 106a.

Generally, when the right-end lane has been selected in the entrance position, the host vehicle travels along the inner periphery through the circulatory roadway 101, and then makes a lane change toward the outer periphery and travels through the host vehicle exit 106a to the exit roadway 112. Therefore, the degree of difficulty in traveling in the circulatory roadway 101 is higher when a lane near the right-end lane has been selected than when the left-end lane has been selected in the entrance position. However, the host vehicle travels through the circulatory roadway 101 along the outer periphery due to the left-end lane being selected, and when the travel distance in the circulatory roadway 101 increases, there is a risk of obstructing the travel of other vehicles exiting the circulatory roadway 101.

To address this problem, in the first embodiment, the entrance position is set based on the positional relationship between the host vehicle entrance 105a and the host vehicle exit 106a, whereby, for example, the entrance position can be set in the left-end lane in a travel scenario in which left-end lane selection is preferred, and the entrance position can be set in the right-end lane in a scenario in which right-end lane selection is preferred. Specifically, in the host vehicle entrance 105a and the entry roadway 111 before the circulatory roadway 101 is entered, a lane appropriate for travel in the circulatory roadway 101 can be selected and traveled in. As a result, the possibility of passing through the roundabout 100 in an appropriate manner can be increased and the incidence of lane changing in the circulatory roadway 101 can be minimized.

Furthermore, obstructing the travel of other vehicles can be prevented by minimizing lane changing in the circulatory roadway 101. Additionally, because a lane appropriate for travel in the circulatory roadway 101 can be selected in advance before entering the circulatory roadway 101, travel time in the circulatory roadway 101 can be shortened and the roundabout 100 can be passed through smoothly.

When the entrance position is set based on the relative positional relationship between the host vehicle entrance 105a and the host vehicle exit 106a, the entrance position is set to the left of the widthwise center position of the host vehicle entrance 105a when the host vehicle exit 106a has been assessed to be present in the area to the left of the front-facing direction L3 of the host vehicle entrance 105a, as is shown in fourth entrance position setting control. When the host vehicle exit 106a has been assessed to be present in the area to the right of the front-facing direction L3 of the host vehicle entrance 105a, the entrance position is set to the right of the widthwise center position of the host vehicle entrance 105a.

Due to this configuration, it is possible to minimize unnecessary lane changing in the circulatory roadway 101 and to minimize the travel distance in the circulatory roadway 101 to shorten travel time in accordance with the relative positional relationship between the host vehicle entrance 105a and the host vehicle exit 106a. Specifically, the host vehicle can pass through the roundabout 100 in an appropriate travel route.

Furthermore, when the entrance position is set based on the presence of radial roadways 110 obtained from the positional relationship between the host vehicle entrance 105a and the host vehicle exit 106a and there are a plurality of radial roadways 110 between the host vehicle entrance 105a and the host vehicle exit 106a, the entrance position is set near the right when traffic turns clockwise through the circulatory roadway 101, and the entrance position is set near the left when traffic turns counterclockwise through the circulatory roadway 101, as is shown in second entrance position setting control.

When the entrance position is set based on the presence of radial roadways 110 obtained from the positional relationship between the host vehicle entrance 105a and the host vehicle exit 106a and there is a high degree of crowding on entry in the radial roadways 110 present between the host vehicle entrance 105a and the host vehicle exit 106a, the entrance position is set near the right when traffic turns clockwise through the circulatory roadway 101, and the entrance position is set near the left when traffic turns counterclockwise through the circulatory roadway 101, as is shown in third entrance position setting control.

Due to this configuration, travel is not readily obstructed for other vehicles entering from the radial roadways 110 between the host vehicle entrance 105a and the host vehicle exit 106a or for other vehicles exiting the radial roadways 110, and it is possible to travel smoothly through the circulatory roadway 101.

When the circulatory roadway outer diameter dimension R1 and/or the circulatory roadway width dimension W1 is equal to or greater than the prescribed value or the entry of vehicles into the circulatory roadway 101 is controlled, there is a high degree of freedom in lane changing within the circulatory roadway 101. In such cases, when the host vehicle exit 106a is present in the front-facing direction L3 of the host vehicle entrance 105a, the entrance position is set in the host vehicle lane as is shown in first entrance position setting control. Due to this configuration, there will not be a need to change lanes while traveling in the entry roadway 111 and the incidence of lane changing while traveling in the entry roadway 111 can be minimized.

When there is a high degree of freedom in lane changing within the circulatory roadway 101 and the host vehicle exit 106a is present in the front-facing direction L3 of the host vehicle entrance 105a, the entrance position may be set anywhere in accordance with, inter alia, the situation in the host vehicle surroundings. Therefore, when the host vehicle passes through the roundabout 100, a more appropriate entrance position can be set, while travel can be reduced in time and increased in smoothness.

Furthermore, when the entrance position is set in another lane, an assessment is made as to whether a lane change toward the entrance position can be smoothly executed, and when it has been assessed that a smooth lane change can be executed, execution of lane-change control is allowed. When it has been assessed that a smooth lane change cannot be executed, execution of lane-change control is not allowed and travel in the host vehicle lane is maintained. Therefore, it is possible to minimize, inter alia, the incidence of rapid changes in vehicle speed and changes in steering accompanying lane changes while traveling in the entry roadway 111, and smooth travel can be performed.

Effects shall be described next. With the driving assist method and driving assist device of the first embodiment, the effects enumerated below can be achieved.

(1) A driving assist method for assisting travel of a host vehicle V, said method comprising providing a controller (recognition assessment processor 3) that calculates a travel route (target route) on which a host vehicle V is caused to travel and executes driving assist control based on the travel route, the method assisting with travel of the host vehicle V, wherein said method is configured such that:

an assessment is made as to whether the host vehicle V has arrived at a roundabout 100 having a circulatory roadway 101 to which three or more radial roadways 110 are connected;

when an assessment has been made that the host vehicle V has arrived at the roundabout 100, a position of an entrance (host vehicle entrance 105a) where the host vehicle V is to enter the circulatory roadway 101 and a position of an exit (host vehicle exit 106a) where the host vehicle V is to exit the circulatory roadway 101 are specified; and an entrance position, which is a widthwise position of the host vehicle V in the entrance (host vehicle entrance 105a), is set based on a positional relationship between the entrance (host vehicle entrance 105a) and the exit (host vehicle exit 106a).

The incidence of lane changing within the circulatory roadway 101 can thereby be minimized.

(2) The driving assist method is configured such that:

the setting of the entrance position is performed based on a relative positional relationship between the entrance (host vehicle entrance 105a) and the exit (host vehicle exit 106a);

when the exit (host vehicle exit 106a) has been assessed to be present in an area to the left of a front-facing direction L3 of the entrance (host vehicle entrance 105a), the entrance position is set to the left of a widthwise center position of the entrance (host vehicle entrance 105a); and when the exit (host vehicle exit 106a) has been assessed to be present in an area to the right of the front-facing direction L3 of the entrance, the entrance position is set to the right of the widthwise center position of the entrance (host vehicle entrance 105a).

It is thereby possible to pass through the circulatory roadway 101 in an appropriate travel route in accordance with the relative positional relationship between the host vehicle entrance 105a and the host vehicle exit 106a.

(3) The driving assist method is configured such that:

an assessment is made as to whether the entrance (host vehicle entrance 105a) has two lanes lined up in a width direction;

when the entrance (host vehicle entrance 105a) has been assessed to have two lanes lined up in the width direction, the setting of the entrance position is performed based on the relative positional relationship between the entrance (host vehicle entrance 105a) and the exit (host vehicle exit 106a);

when the exit (host vehicle exit 106a) has been assessed to be present in the area to the left of the front-facing direction L3 of the entrance (host vehicle entrance 105a) or in the front-facing direction L3 of the entrance (host vehicle entrance 105a), the entrance position is set in a left lane 111L; and when the exit (host vehicle exit 106a) has been assessed to be present in the area to the right of the front-facing direction L3 of the entrance (host vehicle entrance 105a), the entrance position is set in a right lane 111R.

It is thereby possible to pass through the circulatory roadway 101 in an appropriate travel route in accordance with the relative positional relationship between the host vehicle entrance 105a and the host vehicle exit 106a.

(4) The driving assist method is configured such that:

an assessment is made as to whether the entrance (host vehicle entrance 105a) has three or more lanes lined up in the width direction;

when the entrance (host vehicle entrance 105a) has been assessed to have three or more lanes lined up in the width direction, the setting of the entrance position is performed based on the relative positional relationship between the entrance (host vehicle entrance 105a) and the exit (host vehicle exit 106a);

when the exit (host vehicle exit 106a) has been assessed to be present in the area to the left of the front-facing direction L3 of the entrance (host vehicle entrance 105a), the entrance position is set in a left-end lane 111L';

when the exit (host vehicle exit 106a) has been assessed to be present in the area to the right of the front-facing direction L3 of the entrance (host vehicle entrance 105a), the entrance position is set in a right-end lane 111R'; and when the exit (host vehicle exit 106a) has been assessed to be present in the front-facing direction L3 of the entrance (host vehicle entrance 105a), the entrance position is set in a lane (center lane 111C) between the left-end lane 111L' and the right-end lane 111R'.

It is thereby possible to travel through the circulatory roadway 101 in an appropriate travel route in accordance with the relative positional relationship between the host vehicle entrance 105a and the host vehicle exit 106a.

(5) The driving assist method is configured such that:

an assessment is made as to whether an outer diameter dimension (circulatory roadway outer diameter dimension R1) of the circulatory roadway 101 is equal to or greater than a first prescribed value at which a distance needed for lane changing within the circulatory roadway 101 can be ensured;

when the outer diameter dimension (circulatory roadway outer diameter dimension R1) has been assessed to be equal to or greater than the first prescribed value, the setting of the entrance position is performed based on the relative positional relationship between the entrance (host vehicle entrance 105a) and the exit (host vehicle exit 106a); and when the exit (host vehicle exit 106a) has been assessed to be present in the front-facing direction L3 of the entrance (host vehicle entrance 105a), the entrance position can be set to any position.

It is thereby possible to pass through the circulatory roadway 101 in an appropriate travel route in accordance with the relative positional relationship between the host vehicle entrance 105a and the host vehicle exit 106a.

(6) The driving assist method is configured such that:

an assessment is made as to whether a width dimension (circulatory roadway width dimension W1) of the circulatory roadway 101 is equal to or greater than a second prescribed value at which lane changing in the circulatory roadway 101 is enabled;

when the width dimension (circulatory roadway width dimension W1) has been assessed to be equal to or greater than the second prescribed value, the setting of the entrance position is performed based on the relative positional relationship between the entrance (host vehicle entrance 105a) and the exit (host vehicle exit 106a); and when the exit (host vehicle exit 106a) has been assessed to be present in the front-facing direction L3 of the entrance (host vehicle entrance 105a), the entrance position can be set to any position.

Due to this configuration, when the host vehicle passes through the roundabout 100, a more appropriate entrance position can be set, while travel can be reduced in time and increased in smoothness.

(7) The driving assist method is configured such that:

an assessment is made as to whether a traffic signal 108 controlling entry to the circulatory roadway 101 is provided;

when the traffic signal 108 has been assessed to be provided, the setting of the entrance position is performed based on the relative positional relationship between the entrance (host vehicle entrance 105a) and the exit (host vehicle exit 106a); and when the exit (host vehicle exit 106a) has been assessed to be present in the front-facing direction L3 of the entrance (host vehicle entrance 105a), the entrance position can be set to any position.

Due to this configuration, when the host vehicle passes through the roundabout 100, a more appropriate entrance position can be set, while travel can be reduced in time and increased in smoothness.

(8) The driving assist method is configured such that when the entrance position can be set to any position, the entrance position is set on an extension line (host vehicle lane) extending along a travel roadway from a current position of the host vehicle V.

It is thereby possible to minimize the incidence of lane changing in the entry roadway 111.

(9) The driving assist method is configured such that:

the setting of the entrance position is performed based on the presence of radial roadways 110 obtained from the positional relationship between the entrance (host vehicle entrance 105a) and the exit (host vehicle exit 106a); and when a plurality of radial roadways 110 have been assessed to be present between the entrance (host vehicle entrance 105a) and the exit (host vehicle exit 106a), the entrance position is set to the right of the widthwise center position of the entrance (host vehicle entrance 105a) in cases in which an advancing direction within the circulatory roadway 101 is clockwise, and the entrance position is set to the left of the widthwise center position of the entrance (host vehicle entrance 105a) in cases in which the advancing direction within the circulatory roadway 101 is counterclockwise.

Due to this configuration, it is possible to minimize the incidence of lane changing within the entry roadway 101 and it is possible to smoothly pass through the roundabout 100 without obstructing the travel of other vehicles entering and exiting the circulatory roadway 101 via the radial roadways 110.

(10) The driving assist method is configured such that:

the setting of the entrance position is performed based on the presence of radial roadways 110 obtained from the positional relationship between the entrance (host vehicle entrance 105a) and the exit (host vehicle exit 106a); and when radial roadways 110 are assessed to be present between the entrance (host vehicle entrance 105a) and the exit (host vehicle exit 106a) and there has been assessed to be a high degree of crowding (degree of crowding on entry) of vehicles entering the circulatory roadway 101 from the radial roadways 110, the entrance position is set to the right of the widthwise center position of the entrance (host vehicle entrance 105a) in cases in which the advancing direction within the circulatory roadway 101 is clockwise, and the entrance position is set to the left of the widthwise center position of the entrance (host vehicle entrance 105a) in cases in which the advancing direction within the circulatory roadway 101 is counterclockwise.

Due to this configuration, it is possible to minimize the incidence of lane changing within the entry roadway 101 and it is possible to smoothly pass through the roundabout 100 without obstructing the travel of other vehicles entering and exiting the circulatory roadway 101 via the radial roadways 110.

(11) The driving assist method is configured such that:

when the entrance position has been set to a position deviated from the extension line (host vehicle lane) extending along the travel roadway from a current position of the host vehicle V, an assessment is made as to whether a lane change toward the entrance position can be smoothly executed by the time the host vehicle arrives at the entrance (host vehicle entrance 105a); and when it has been assessed that the lane change can be smoothly executed, execution of the lane change is allowed.

Due to this configuration, it is possible to prevent instances of rapid changing in vehicle speed and changes in steering accompanying lane changing, and to minimize the incidence of discomfort on the part of vehicle occupant so as to provide smooth travel.

(12) A driving assist device provided with a controller (recognition assessment processor 3) that calculates a travel route (target route) over which a host vehicle V is caused to travel and executes driving assist control for assisting travel of the host vehicle V based on the travel route, wherein the controller (recognition assessment processor 3) is configured from:

an arrival assessment part 32 that assesses whether or not the host vehicle V has arrived at a roundabout 100 having a circulatory roadway 101 to which three or more radial roadways 110 are connected;

a position-specifying part 33 that, when the host vehicle V has been assessed by the arrival assessment part 32 to have arrived at the roundabout 100, specifies a position of an entrance (host vehicle entrance 105a) where the host vehicle V is to enter the circulatory roadway 101 and a position of an exit (host vehicle exit 106a) where the host vehicle V is to exit the circulatory roadway 101; and an entrance-position-setting part 35 that sets an entrance position, which is a widthwise position of the host vehicle V in the entrance (host vehicle entrance 105a), based on a positional relationship between the entrance (host vehicle entrance 105a) and the exit (host vehicle exit 106a) specified by the position-specifying part 33.

It is thereby possible to minimize the incidence of lane changing in the entry roadway 101.

The driving assist method and the driving assist device of the present disclosure were described above based on the first embodiment, but this example is not provided by way of limitation on the specific configuration; design changes, additions, etc., are allowed as long as there is no deviation from the scope of the invention as in the claims.

In the first embodiment, an example was presented in which the assessment that the host vehicle V has arrived at the roundabout 100 is made due to the distance from the host vehicle V to the host vehicle entrance 105a having reached a threshold value distance or less. However, this example is not provided by way of limitation. For example, whether or not the host vehicle V has arrived at the roundabout 100 may be assessed using, as a reference, the time needed for the host vehicle V to arrive at a location of entry (host vehicle entrance 105a) into the circulatory roadway 101. The time needed to arrive at the host vehicle entrance 105a is determined based on a vehicle speed profile and a drive distance to the host vehicle entrance 105a.

In the first embodiment, an example was presented in which entrance position setting control is executed when the host vehicle entrance 105a is a plurality of lanes, and the entrance position is set based on the positional relationship between the host vehicle entrance 105a and the host vehicle exit 106a. However, entrance position setting control may be executed even when the host vehicle entrance 105a is one lane. In this case, the entrance position for the host vehicle V is set within the one lane to a position nearer to the left side than the widthwise center position of the lane or to a position nearer to the right side than the widthwise center position of the lane, whereby the travel route within the circulatory roadway 101 can be made appropriate and it is possible to minimize the incidence of lane changing within the entry roadway 101.

In the first embodiment, an example was presented in which the positional relationship of the host vehicle exit 106a is assessed using the front-facing direction L3 of the host vehicle entrance 105a as a reference, but this example is not provided by way of limitation. For example, the position of the host vehicle V in the host vehicle entrance 105a is designated as the "position of the entrance where the host vehicle is to enter the circulatory roadway," and using this position of the host vehicle V as a reference, a direction in which the host vehicle V faces forward is designated as the "front-facing direction of the entrance." An assessment may then be made as to whether the host vehicle exit 106a is present in the area to the left of the direction in which the host vehicle V faces forward or is present in the area to the right.

In the first embodiment, an example was presented in which driving assist control is executed during travel under autonomous driving. However, this example is not provided by way of limitation; driving assist control may be executed during travel under manual driving in which the driver causes the host vehicle to travel/stop by their own intention. In this case, information of the entrance position is presented to the driver via the display device 7 after the entrance position has been set based on the positional relationship between the host vehicle entrance 105a and the host vehicle exit 106a. The driver may also be made aware of the information of the entrance position by a voice, etc.

In the first embodiment, an example was presented in which travel in the host vehicle lane is maintained when a lane change toward the entrance position cannot be executed, but this example is not provided by way of limitation. For example, in cases such as when a lane change toward the entrance position cannot be executed or there are many other vehicles and free travel has been assessed to be difficult, the entrance position may be set to a position such that the travel position in the circulatory roadway 101 runs the outer periphery. In this case, although the entrance position is not set based on the positional relationship between the host vehicle entrance 105a and the host vehicle exit 106a, it is possible to pass through the circulatory roadway 101 without making a lane change therein.

The invention claimed is:

1. A method for driving assist performed using a controller that calculates a travel route over which a host vehicle is to travel and executes a driving assist control causing the host vehicle to travel based on the travel route, the driving assist method comprising:
   assessing whether the host vehicle has arrived at a roundabout having a circulatory roadway to which three or more radial roadways are connected;
   when the assessing indicates the host vehicle has arrived at the roundabout, specifying a location of an entrance of the circulatory roadway where the host vehicle is to enter the circulatory roadway and specifying a location of an exit of the circulatory roadway where the host vehicle is to exit the circulatory roadway;
   determining whether the entrance is one lane;
   upon determining the entrance is one lane, setting an entrance position of the host vehicle based on a positional relationship between the entrance and the exit of the circulatory roadway, the entrance position being a widthwise position of the host vehicle within the one lane;
   setting a target travel position of the host vehicle within the one lane; and
   causing the host vehicle to align with the target travel position and travel toward the entrance position by generating a command value and outputting the command value to an actuator of the host vehicle.

2. The driving assist method according to claim 1, wherein
   when the positional relationship is such that the exit is located in an area leftward of a front-facing direction of the entrance, the entrance position is set leftward of a widthwise center position of the one lane at the entrance; and
   when the positional relationship is such that the exit is located in an area rightward of the front-facing direction of the entrance, the entrance position is set rightward of the widthwise center position.

3. The driving assist method according to claim 1, further comprising
   assessing whether the entrance has two lanes lined up in a width direction;
   when an assessment has been made that the entrance has two lanes lined up in the width direction, the setting of the entrance position is performed based on the positional relationship between the entrance and the exit;
   when an assessment has been made that the exit is located in the area leftward of the front-facing direction of the entrance or in the front-facing direction of the entrance, the entrance position is set in a left lane; and
   when an assessment has been made that the exit is located in the area rightward of the front-facing direction of the entrance, the entrance position is set in a right lane.

4. The driving assist method according to claim 1, further comprising
   assessing whether the entrance has three or more lanes lined up in the width direction;
   when an assessment has been made that the entrance has three or more lanes lined up in the width direction, the setting of the entrance position is performed based on the positional relationship between the entrance and the exit;
   when an assessment has been made that the exit is located in the area leftward of the front-facing direction of the entrance, the entrance position is set in a left-end lane;
   when an assessment has been made that the exit is located in the area rightward of the front-facing direction of the entrance, the entrance position is set in a right-end lane; and
   when an assessment has been made that the exit is located in the front-facing direction of the entrance, the entrance position is set in a lane between the left-end lane and the right-end lane.

5. The driving assist method according to claim 1, further comprising
   assessing whether an outer diameter dimension of the circulatory roadway is equal to or greater than a first prescribed value at which a distance needed for lane changing within the circulatory roadway can be ensured;
   when an assessment has been made that the outer diameter dimension is equal to or greater than the first prescribed value, the setting of the entrance position is performed based on the positional relationship between the entrance and the exit; and
   when an assessment has been made that the exit is located in the front-facing direction of the entrance, the entrance position can be set to any position.

6. The driving assist method according to claim 1, further comprising
   assessing whether a width dimension of the circulatory roadway is equal to or greater than a second prescribed value at which lane changing in the circulatory roadway is enabled;
   when an assessment has been made that the width dimension is equal to or greater than the second prescribed value, the setting of the entrance position is performed based on the positional relationship between the entrance and the exit; and
   when an assessment has been made that the exit is located in the front-facing direction of the entrance, the entrance position can be set to any position.

7. The driving assist method according to claim 1, further comprising
   assessing whether a traffic signal controlling entry to the circulatory roadway is provided;
   when an assessment has been made that the traffic signal is provided, the setting of the entrance position is performed based on the positional relationship between the entrance and the exit; and
   when an assessment has been made that the exit is located in the front-facing direction of the entrance, the entrance position can be set to any position.

8. The driving assist method according to claim 5, wherein
   when the entrance position can be set to any position, the entrance position is set on an extension line extending along a travel roadway from a current position of the host vehicle.

9. The driving assist method according to claim 1, wherein
the setting of the entrance position is performed based on a presence of radial roadways obtained from the positional relationship between the entrance and the exit; and
when an assessment has been made that a plurality of radial roadways exist between the entrance and the exit, the entrance position is set rightward of a widthwise center position of the one lane at the entrance in cases in which an advancing direction within the circulatory roadway is clockwise, and the entrance position is set leftward of the widthwise center position of the one lane at the entrance in cases in which the advancing direction within the circulatory roadway is counterclockwise.

10. The driving assist method according to claim 1, wherein
the setting of the entrance position is performed based on a presence of radial roadways obtained from the positional relationship between the entrance and the exit; and
when an assessment has been made that radial roadways exist between the entrance and the exit and an assessment has been made that there is a degree of crowding of vehicles entering the circulatory roadway from the radial roadways higher than a threshold value, the entrance position is set rightward of a widthwise center position of the one lane at the entrance in cases in which the advancing direction within the circulatory roadway is clockwise, and the entrance position is set leftward of the widthwise center position of the one lane at the entrance in cases in which the advancing direction within the circulatory roadway is counterclockwise.

11. The driving assist method according to claim 1, wherein
assessing whether a lane change toward the entrance position can be executed by a time when the host vehicle arrives at the entrance when the entrance position has been set to a position deviated from an extension line extending along the travel roadway from the current position of the host vehicle; and
when an assessment has been made that the lane change can be smoothly executed, execution of the lane change is allowed.

12. A driving assist device comprising:
a controller configured to calculate a travel route over which a host vehicle is to travel and execute a driving assist control causing the host vehicle to travel based on the travel route,
the controller including:
an arrival assessment part that assesses whether or not the host vehicle has arrived at a roundabout having a circulatory roadway to which three or more radial roadways are connected;
a position-specifying part that, when the arrival assessment part has assessed that the host vehicle has arrived at the roundabout, specifies a location of an entrance of the circulatory roadway where the host vehicle is to enter the circulatory roadway and a location of an exit of the circulatory roadway where the host vehicle is to exit the circulatory roadway;
a lane assessment part that determines whether the entrance is one lane; and
an entrance-position-setting part that sets an entrance position of the host vehicle based on a positional relationship between the entrance and the exit of the circulatory roadway, the entrance position being a widthwise position of the host vehicle within the one lane at the entrance when it has been determined that the entrance is one lane,
the controller being configured to
set a target travel position of the host vehicle within the one lane and
cause the host vehicle to align with the target travel position and travel toward the entrance position by generating a command value and outputting the command value to an actuator of the host vehicle.

13. The driving assist device according to claim 12, wherein
entrance-position-setting part sets the entrance position
leftward of a widthwise center position of the one lane at the entrance when the positional relationship is such that the exit is located in an area leftward of a front-facing direction of the entrance, and
rightward of the widthwise center position of the one lane at the entrance when the positional relationship is such that the exit is located in an area rightward of the front-facing direction of the entrance.

* * * * *